(12) United States Patent
Kim

(10) Patent No.: US 10,628,517 B2
(45) Date of Patent: Apr. 21, 2020

(54) METHOD, ELECTRONIC APPARATUS AND STORAGE MEDIUM FOR CONFIGURING A SCREEN USING A SUBSTITUTE FONT

(71) Applicant: Samsung Electronics Co., Ltd., Suwon-si, Gyeonggi-do (KR)

(72) Inventor: Goo-Hyun Kim, Anyang-si (KR)

(73) Assignee: Samsung Electronics Co, Ltd., Suwon-si (KR)

( * ) Notice: Subject to any disclaimer, the term of this patent is extended or adjusted under 35 U.S.C. 154(b) by 474 days.

(21) Appl. No.: 14/950,654

(22) Filed: Nov. 24, 2015

(65) Prior Publication Data

US 2016/0147717 A1 May 26, 2016

(30) Foreign Application Priority Data

Nov. 26, 2014 (KR) .......................... 10-2014-0166762

(51) Int. Cl.
  *G06F 17/21* (2006.01)
  *G06T 11/00* (2006.01)
  *G06T 11/20* (2006.01)

(52) U.S. Cl.
  CPC ............ *G06F 17/214* (2013.01); *G06T 11/00* (2013.01); *G06T 11/203* (2013.01)

(58) Field of Classification Search
  CPC .................................................... G06F 17/214
  See application file for complete search history.

(56) References Cited

U.S. PATENT DOCUMENTS

| 5,185,818 | A | * | 2/1993 | Warnock | ............... | G06F 17/214 |
|  |  |  |  |  |  | 345/471 |
| 5,825,987 | A | * | 10/1998 | Asada | ................... | G06K 15/02 |
|  |  |  |  |  |  | 358/1.11 |
| 5,859,648 | A | * | 1/1999 | Moore | .................. | G06F 17/214 |
|  |  |  |  |  |  | 345/471 |
| 6,552,728 | B1 | * | 4/2003 | Moore | .................. | G06F 17/214 |
|  |  |  |  |  |  | 345/467 |
| 2006/0168514 | A1 | * | 7/2006 | Tokunaga | ............. | G06F 17/211 |
|  |  |  |  |  |  | 715/230 |
| 2008/0144062 | A1 |  | 6/2008 | Nakatsuka |  |  |

(Continued)

FOREIGN PATENT DOCUMENTS

| EP | 0 632 396 A2 | 1/1995 |
| FR | 2 979 732 A1 | 3/2013 |

(Continued)

OTHER PUBLICATIONS

Chinese Office Action dated Feb. 3, 2020, issued in Chinese Application No. 201510845413.4.

*Primary Examiner* — Kavita Padmanabhan
*Assistant Examiner* — Tyler Schallhorn
(74) *Attorney, Agent, or Firm* — Jefferson IP Law, LLP

(57) ABSTRACT

A method of configuring a screen of an electronic apparatus is provided. The method includes obtaining the data that is configured in the first configuration based on the first font, configuring the data in the second configuration, based on the second font, and if the difference between the first configuration and the second configuration is greater than a predetermined critical value, changing the second configuration into the third configuration to then be displayed, wherein the difference between the first configuration and the third configuration is less than predetermined critical value.

24 Claims, 29 Drawing Sheets

(56) References Cited

U.S. PATENT DOCUMENTS

| | | |
|---|---|---|
| 2010/0299395 A1 | 11/2010 | Klassen |
| 2012/0096344 A1 | 4/2012 | Ho et al. |
| 2013/0254655 A1 | 9/2013 | Nykyforov |
| 2013/0325795 A1* | 12/2013 | Harris .................. G06F 17/214 707/608 |
| 2013/0326348 A1* | 12/2013 | Ip ......................... G06F 17/214 715/269 |
| 2014/0108897 A1 | 4/2014 | Boutelle et al. |
| 2014/0210863 A1 | 7/2014 | Osaka |

FOREIGN PATENT DOCUMENTS

| | | |
|---|---|---|
| KR | 10-2014-0040994 A | 4/2014 |
| TW | 400501 B | 8/2000 |

* cited by examiner

METHOD, ELECTRONIC APPARATUS AND STORAGE MEDIUM FOR CONFIGURING A SCREEN USING A SUBSTITUTE FONT

CROSS-REFERENCE TO RELATED APPLICATION(S)

This application claims the benefit under 35 U.S.C. § 119(a) of a Korean patent application filed on Nov. 26, 2014 in the Korean Intellectual Property Office and assigned Serial number 10-2014-0166762, the entire disclosure of which is hereby incorporated by reference.

TECHNICAL FIELD

The present disclosure relates to a screen configuration of an electronic apparatus. More particularly, the present disclosure relates to a screen configuration that includes objects that are related to fonts.

BACKGROUND

Currently, data transmission between electronic apparatuses is rapidly increasing. This relates to a sudden increase in the introduction of mobile electronic apparatuses capable of performing wireless communication. The mobile electronic apparatus may receive data from another electronic apparatus through the wireless communication, and may display the received data. Accordingly, a user may operate to transmit the data that is viewed or written in one electronic apparatus to the other electronic apparatus, and the user may additionally view or write the received data through the other electronic apparatus.

Additionally, each electronic apparatus may store supportable tints in advance. For example, the first electronic apparatus may support the first font, and may display data based on a predetermined attribute of the first font. More specifically, the first electronic apparatus may display the first configuration that is formed based on various attributes of the first font, such as size, width, height, a height-to-width ratio, kerning, line space, and the like. The first electronic apparatus may pre-store predetermined attributes of the first font, and may configure and display the data in response to the pre-stored attributes.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for configuring a screen of an electronic apparatus A user may manipulate the first electronic apparatus such that data, which is configured to correspond to a first font, is viewed in a first electronic apparatus and is then transmitted to a second electronic apparatus. However, the second electronic apparatus may not support the first font. If the first font is not supported, the second electronic apparatus may configure the received data with a second font that is related to the first font. However, attributes of the second font may be different from that of the first font, so the display configuration of the second electronic apparatus may be different from the display configuration of the first electronic apparatus. In particular, when the data that is optimized for the display configuration of the first electronic apparatus is displayed in the second electronic apparatus, such a difference may be severe.

In accordance with an aspect of the present disclosure, a method of configuring a screen of an electronic apparatus is provided. The method includes obtaining data that is configured in a first configuration based on a first font, configuring the data in a second configuration, based on a second font, and changing, if the difference between the first configuration and the second configuration is greater than a predetermined critical value, the second configuration into a third configuration to then be displayed, wherein the difference between a first configuration and the third configuration is less than the predetermined critical value.

In accordance with another aspect of the present disclosure, an electronic apparatus is provided. The electronic device includes a display, and a processor that configured to configure, when data that is configured in a first configuration based on a first font is obtained, the data, in a second configuration based on a second font, and change, if a difference between the first configuration and the second configuration is greater than a predetermined critical value, second configuration into the third configuration to then be displayed, wherein a difference between the first configuration and the third configuration is less than the predetermined critical value.

In accordance with another aspect of the present disclosure, a method of configuring a screen is provided. The method includes obtaining data that includes a first configuration that is comprised of a plurality of objects to correspond to a first display, configuring the data in a second configuration to correspond to a second display, and changing, if a difference between the first configuration and the second configuration is greater than a predetermined critical value, the second configuration into a third configuration that corresponds to the first configuration to then be displayed.

In accordance with another aspect of the present disclosure, a method of configuring a screen is provided. The method includes obtaining data that includes a first object related to a first font, and a second object, and changing an attribute of the first object, based on a correlation between the first object and the second object, to display the attribute.

In accordance with another aspect of the present disclosure, a method of configuring a screen of a second electronic apparatus that communicates with a first electronic apparatus is provided. The method include: obtaining data in a first font from the first electronic apparatus, expressing the data by using the second font, and changing, if a second layout based on a second font is different from the first layout based on the first font, an attribute of the second font such that the second layout corresponds to the first layout, and displaying the attribute.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
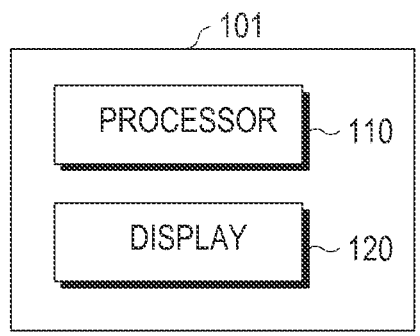
FIG. 1 illustrates a block diagram of an electronic apparatus, according to various embodiments of the present disclosure.

The present following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the expression "have", "may have", "include" or "may include" refers to existence of a corresponding feature (e.g., numerical value, function, operation, or components such as elements), and does not exclude existence of additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. The above expressions are used merely for the purpose of distinguishing an element from the other elements. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure. In some cases, even the term defined in the present disclosure should not be interpreted to exclude embodiments of the present disclosure.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), a Moving Picture Experts Group phase 1 or phase 2 (MPEG-1 or MPEG-2) audio layer 3 (MP3) player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

According to some embodiments, the electronic device may be a smart home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation), an electronic dictionary, an electronic key, a camcorder, and an electronic photo frame.

According to another embodiment of the present disclosure, the electronic device may include at least one of various medical devices (e.g., various portable medical measuring devices (a blood glucose monitoring (levice, a heart rate monitoring device, a blood pressure measuring device, a body temperature measuring device, and the like), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a Vehicle infotainment Devices, an electronic devices for a ship (e.g., a navigation device for a ship, and a gyro-compass), avionics, security devices, an automotive head unit, a robot for home or industry, an automatic teller's machine (ALM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, and the like).

According to various embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to various embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a block diagram of an electronic apparatus, according to various embodiments of the present disclosure.

Referring to FIG. 1, an electronic apparatus 101, according to various embodiments of the present disclosure, is disclosed. The electronic apparatus 101 may include a processor 110 and a display 120. Although it is not shown in the drawing, a bus, for example, may include a circuit that connects the elements 110 and 120 to each other and transfers communication (e.g., control messages and/or data) between the elements.

The processor 110 may include one or more of a CPU, an AP, or a communication processors (CP). The processor 110, for example, may execute a calculation or data-processing for the control and/or communication of one or more other elements of the electronic apparatus 101. The processor 110 may be referred to as a controller, or may include the controller as a part thereof.

The display 120 is, for example, may include a liquid crystal display (LCD), a light emitting diode (LED) display, an organic light emitting diode (OLED) display, a micro-electro-mechanical system (MEMS) display, or an electronic paper display. The display 160, for example, may display a variety of content (e.g., text, images, videos, icons, or symbols) to the user. The display 120 may include a touch screen, and, for example, may receive an input of a touch using a part of a user's body, a gesture input, proximity input, or a hovering input.

Figure 2:
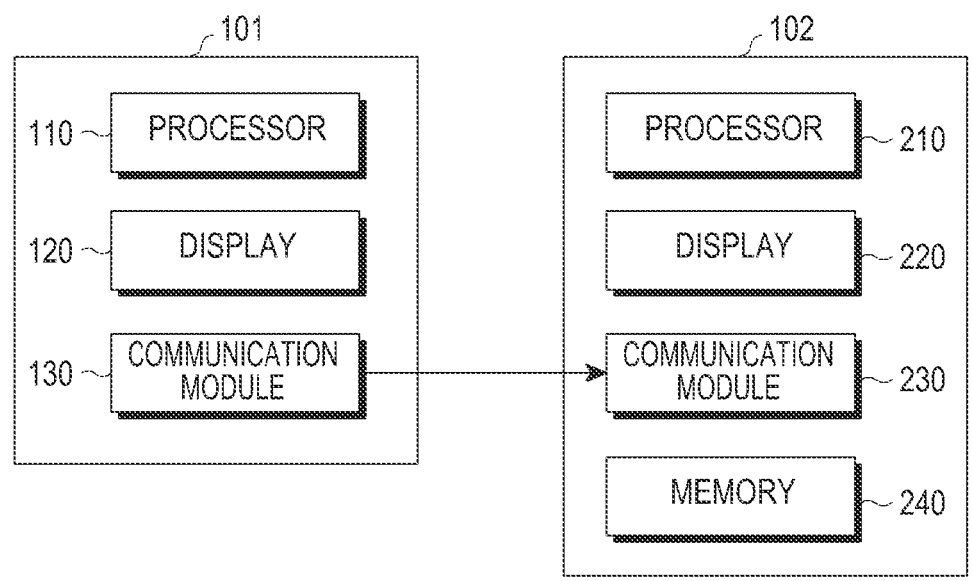
FIG. 2 illustrates a block diagram of the first electronic apparatus and the second electronic apparatus, which are connected with each other, according to various embodiments of the present disclosure.

FIG. 2 illustrates a block diagram of a first electronic apparatus and a second electronic apparatus, according to various embodiments of the present disclosure.

Referring to FIG. 2, a first electronic apparatus 101 may further include a communication module 130. The communication module 130, for example, may establish communication between the first electronic apparatus 101 and a second electronic apparatus 102. For example, the communication module 130 may be connected to a network through wireless communication or wired communication, and may communicate with the second electronic apparatus 102.

The wireless communication, for example, may use one or more cellular communication protocols, such as long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). The wired communication, for example, may include at least one of a universal serial bus (USB), a high definition multimedia interface (HDMI), recommended standard 232 (RS-232), or a plain old telephone service (POTS). The network may include one or more telecommunication networks, such as a computer network (e.g., local area network (LAN) or wide area network (WAN)), the Internet, or a telephone network.

Furthermore, the first electronic apparatus 101 may transmit/receive data to/from the second electronic apparatus 102 through short-range communication. For example, the first electronic apparatus 101 may transmit/receive data to/from the second electronic apparatus 102 through Bluetooth communication, Bluetooth low energy communication, Wi-Fi Direct communication, Zig-bee communication, near field communication (NFC), infrared communication, visible light communication, and the like, but the short-range communication method is not limited thereto.

The second electronic apparatus 102 may include a processor 210, a display 220, a communication module 230, and a memory 240. The communication module 230 may transmit/receive data to/from the communication module 130 of the first electronic apparatus 101 according to the various methods mentioned above.

The memory 240 may include a volatile and/or non-volatile memory. The memory 240, for example, may store commands or data related to one or more other elements of the second electronic apparatus 102. According to an embodiment, the memory 240 may store software and/or programs. The programs may include, for example, a kernel, middleware, an application programming interface (API), and/or an application programs (or "applications"). At least some of the kernel, the middleware, or the API may be referred to as an operating system (OS). In addition, the memory 240 may store font-related information.

Figure 3:
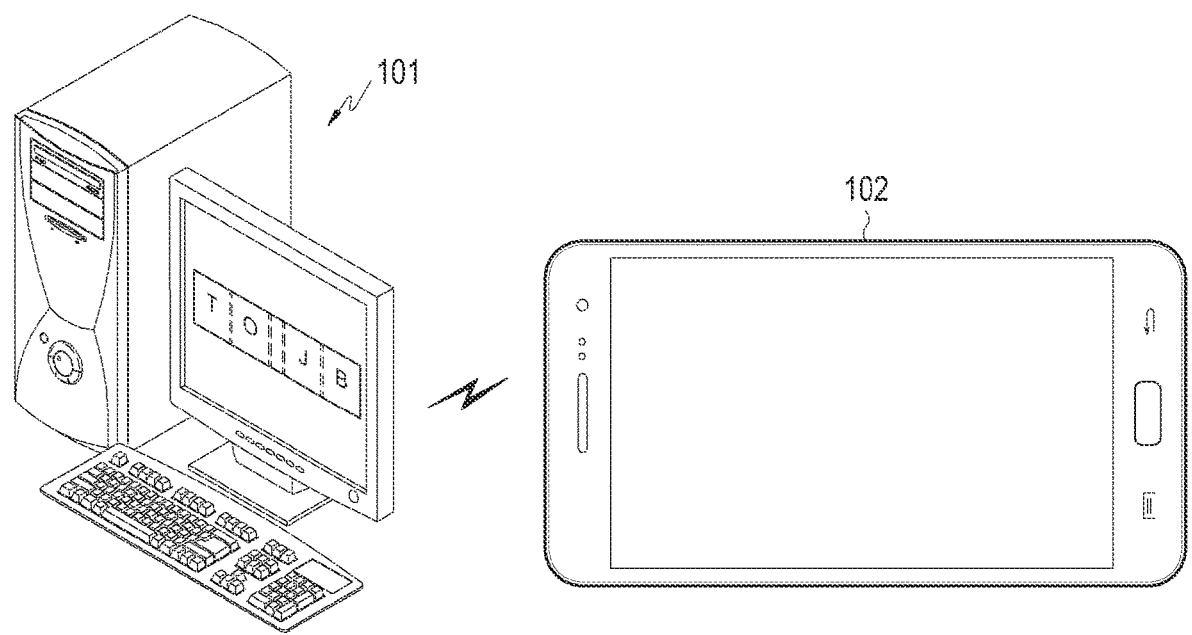
FIG. 3 illustrates a conceptual diagram of an electronic apparatus, according to various embodiments of the present disclosure.

FIG. 3 illustrates a conceptual diagram of an electronic apparatus, according to various embodiments of the present disclosure.

Referring to FIG. 3, a first electronic apparatus 101, for example, may be a desktop computer that can execute a word processing application, and a second electronic apparatus 102 may be a mobile communication electronic device, such as a tablet computer. In an embodiment, the first electronic apparatus 101 may display the first screen on the basis of the first font, and the second electronic apparatus 102 may display the second screen on the basis of the second font that is different from the first font. The second electronic apparatus 102 may not support the first font, and thus may display the second screen based on the second font. The second electronic apparatus 102, according to various embodiments of the present disclosure, may configure the second screen such that the configuration of the second screen is substantially similar to that of the first screen, which will be described later in more detail.

Figure 4:
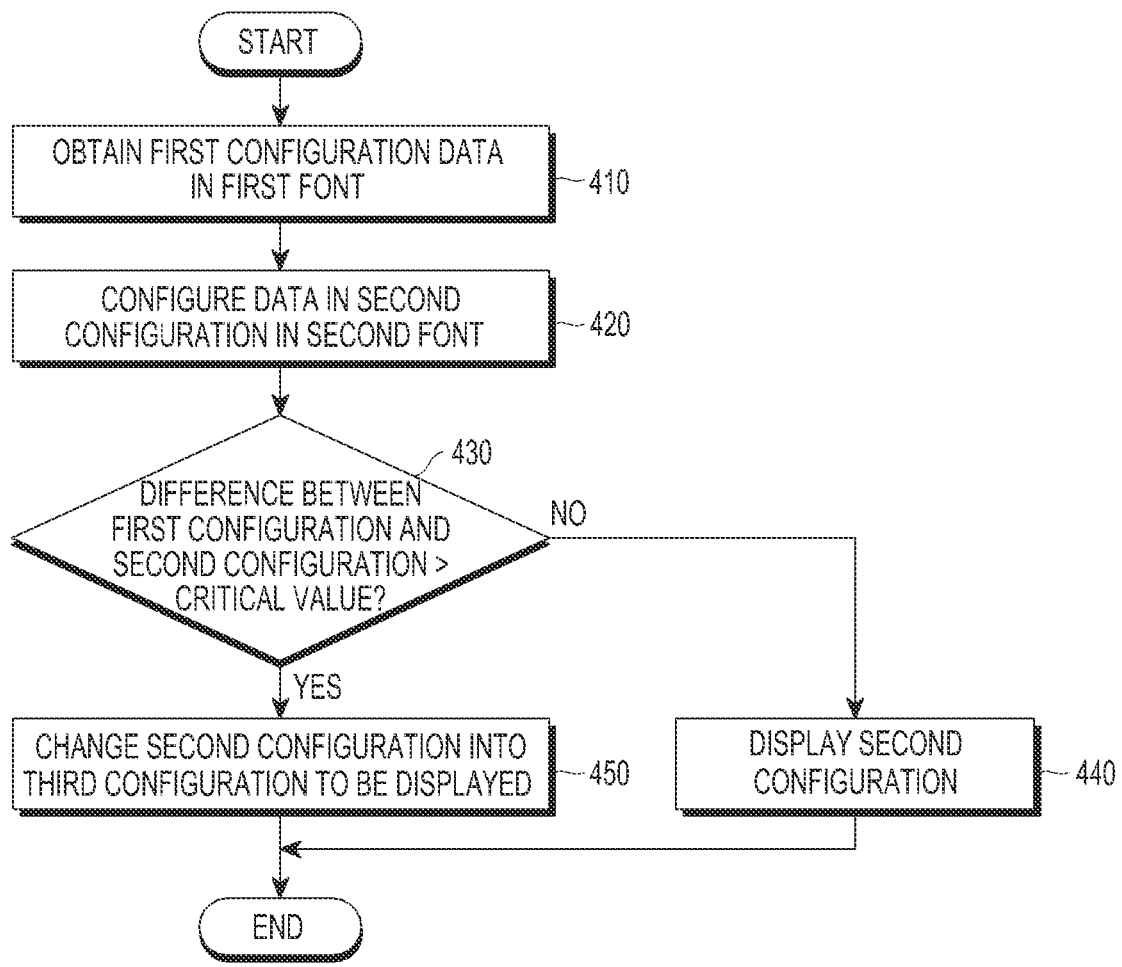
FIG. 4 is a flowchart of a method for configuring a screen, according to various embodiments of the present disclosure.

FIG. 4 is a flowchart of a screen configuration method, according to various embodiments of the present disclosure. The embodiment of FIG. 4 will be described in more detail with reference to FIGS. 5A to 5C.

Figure 5A:
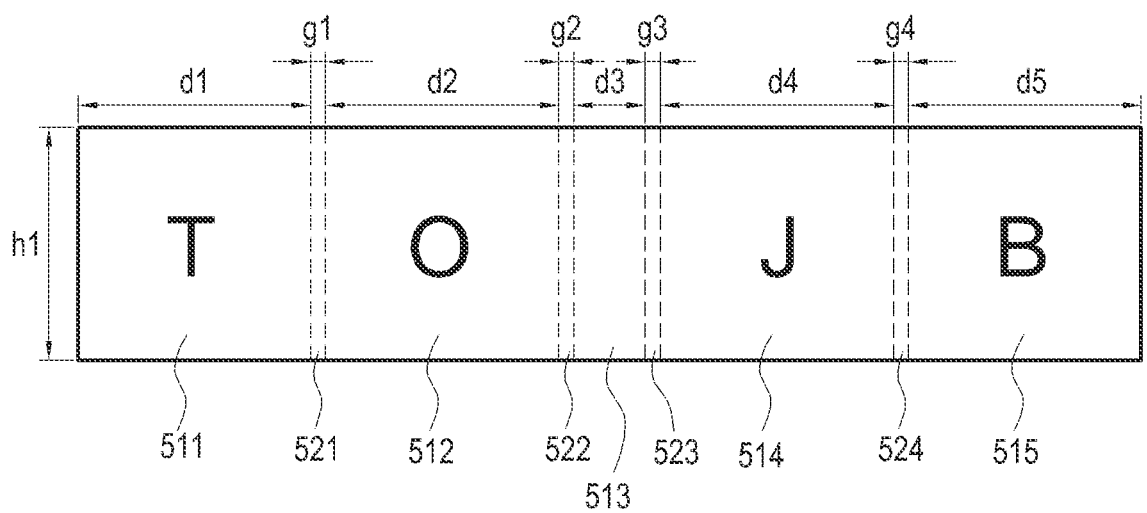
FIGS. 5A to 5C illustrate examples of a screen configuration, according to various embodiments of the present disclosure.
Figure 5B:
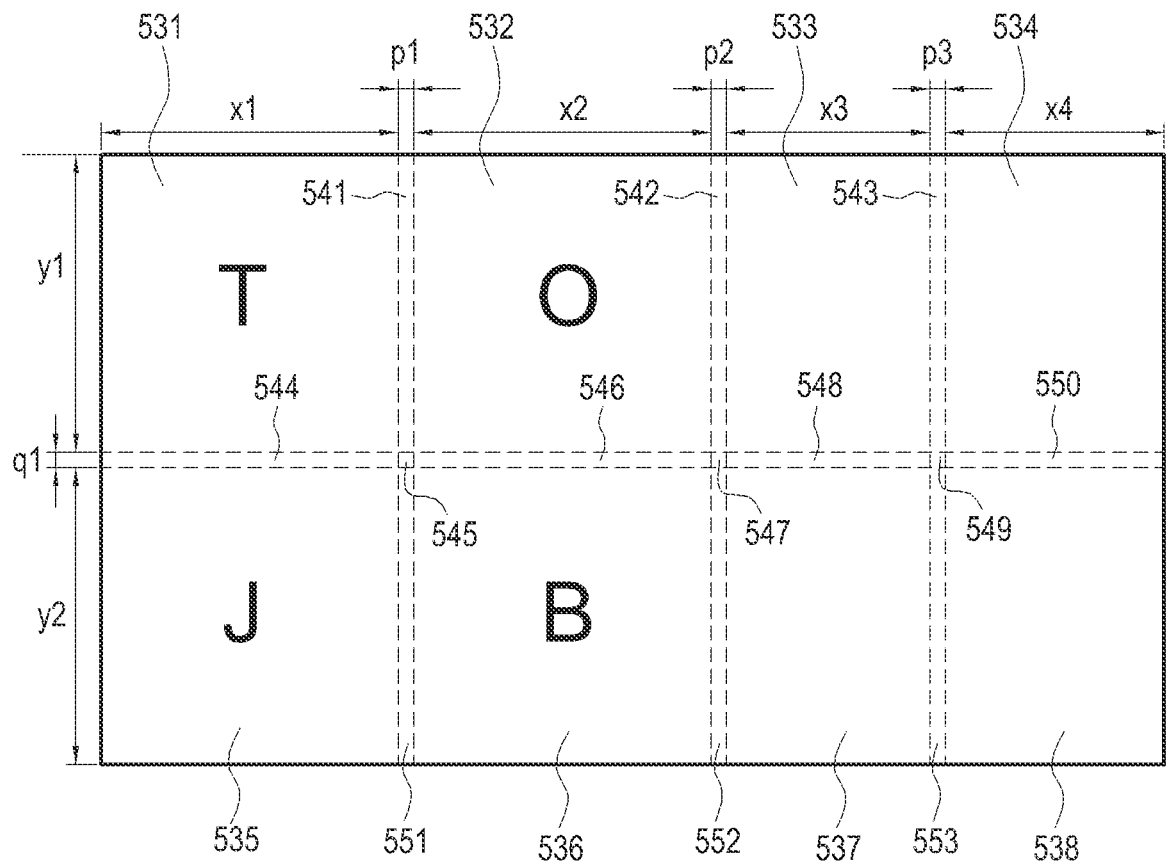
Figure 5C:
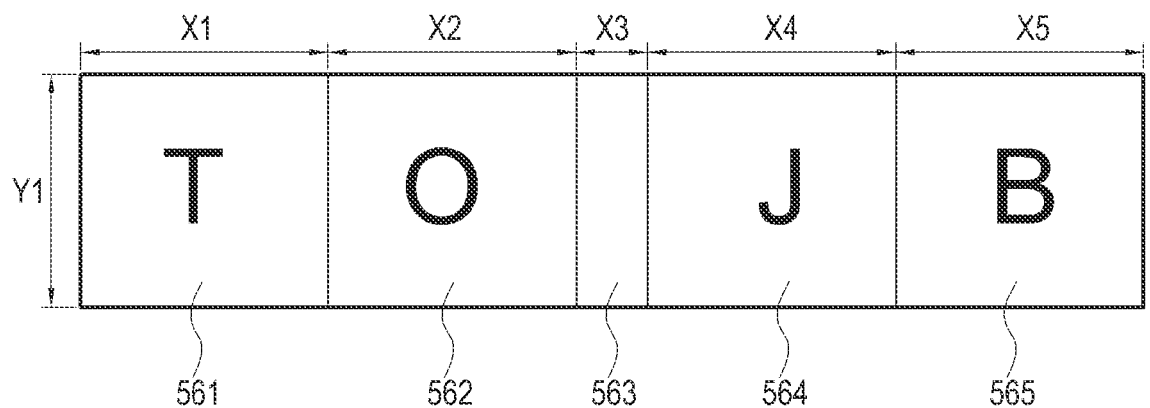

FIGS. 5A to 5C illustrate examples of a screen configuration, according to various embodiments of the present disclosure.

Referring to FIGS. 4 and 5A to 5C, in operation 410, the electronic apparatus 101 may obtain the data in the first configuration using the first font. For example, the electronic apparatus 101, as illustrated in FIG. 5A, may obtain the data "TOJB" in the first font. The first font may include predetermined font attributes. Table 1 shows an example of the font attributes, according to various embodiments of the present disclosure.

TABLE 1

| Font Attributes |
|---|
| Font Name |
| Font Style |
| Font Width |
| Font Height |
| Kerning |
| Height-to-width ratio |
| Boldness |
| Baseline |
| Ascender, |
| Descender Information |

The font name may include identifier information of the font. The font style may include information that describes the form of the font, and for example, may include serif information that indicates a protruding form of an end of the stem of the font. The font width may include information on the horizontal length of the font. The font height may include information on the vertical length of the font. The kerning may include information on the degree of overlap between two fonts that are adjacent to each other. The kerning may be referred to as the space between letters depending on the implementation. The height-to-width ratio may include information on the ratio of the horizontal length to the vertical length of a single font. The height-to-width ratio may be referred to as mono space information depending on the implementation. The boldness may include information related to the boldness of the font, and for example, may indicate the degree of boldness, such as 'light,' 'normal,' and 'bold' The baseline may include information on the line space of the font. The ascender and the descender may include information on the font that extends upwards, such as "b," "d," "h," and "l," based on the horizontal direction, and information on the font that extends downwards, such as "p," based on the horizontal direction, respectively.

Referring back to FIG. 5A, based on the pre-stored attributes of the first font regarding the letter "T," the electronic apparatus 101 may determine the font width (d1) of "T" and the font height (h1) of "T." Accordingly, the electronic apparatus 101 may create a font "T" 511 that reflects the font width (d1) of "T" and the font height (h1) of "T." Likewise, the electronic apparatus 101 may create a font "O" 512 that reflects the font width (d2) of "O" and the font height (h1) of "O." In addition, the electronic apparatus 101 may create a font "J" 514 that reflects the font width (d4) of "J" and the font height (h1) of "J," and a font "B" 515 that reflects the font width (d5) of "B" and the font height (h1) of "B," respectively. In addition, the electronic apparatus 101 may create a font 513 that reflects the width (d3) and the height (h1) of the space.

In addition, the electronic apparatus 101 may create a first space 521 to a fourth space 524, based on the kerning of the first font attributes. The first space 521 to the fourth space 524 may have a horizontal length of g1, g2, g3, or g4, respectively. Although the first space 521 to the fourth space 524 may have the same horizontal length, in another embodiment, the horizontal length may be different from each other depending on the front and next letters. For example, in the case where the letter that extends in the vertical direction is consecutively arranged, such as "HH," the space between letters may be relatively large, whereas in the case where two letters are formed to be parallel to each other, such as "AV," the space between letters may be relatively small.

As described above, the electronic apparatus 101 may create the fonts 511 to 515 and the spaces 521 to 524 on the basis of the first font attributes in order to thereby obtain the first configuration data. Here, the fonts 511 to 515 and the spaces 521 to 524 of the first configuration may be referred to as a first layout. That is, the layout may include all of the fonts and spaces of the configuration that is based on a specific font, and the remaining areas corresponding to the fonts or spaces.

Although the electronic apparatus 101 is described to create the first configuration in the embodiment above, this merely means that the embodiment above can be applied when the data is configured in the first font. In fact, the electronic apparatus 101 may not configure the data in the first configuration, and in operation 410, the electronic apparatus 101 is to obtain the data that has the first configuration in the case of using the first font.

Referring back to FIG. 4, in operation 420, the electronic apparatus 101 may configure the obtained data in the second configuration, based on the second font.

Referring to FIG. 5B, the electronic apparatus 101 may configure the data in the second configuration based on the second font attributes. More specifically, based on the pre-stored attributes of the second font regarding the letter "T," the electronic apparatus 101 may determine the font width (x1) of "T" and the font height (y1) of "T." According to this, the electronic apparatus 101 may create a font "T" 531 that reflects the font width (x1) and "T" and the font height (y1) of the "T." The second font attributes may be different from the first font attributes. Thus, the font width (x1) of "T" and the font height (y1) of "T" according to the second font attributes may be different from the font width (d1) of "T" and the font height (h1) of "T" according to the first font attributes. In the embodiment of FIG. 5B, the font width (x1) of "T" according to the second font attributes may be greater than the font width (d1)) of "T" according to the first font attributes.

Likewise, the electronic apparatus 101 may create a font "O" 532 that reflects the font width (x2) of "O" and the font height (y1) of "O," a font "J" 535 that reflects the font width (x1) of "J" and the font height (y2) of "J," and a font "B" 536 that reflects the font width (x2) of "B" and the font height (y2) of "B." In addition, the electronic apparatus 101 may create a font 533 that reflects the width (x3) and the height (y1) of the space.

In addition, the electronic apparatus 101 may create a first space 541, a second space 542, a third space 543, and a fourth space 551, based on the kerning of the second font attributes. The first space 541, the second space 542, the third space 543, and the fourth space 551 may have a horizontal length of p1, p2, p3, or p1, respectively. Although the first space 541, the second space 542, the third space 543, and the fourth space 551 may have the same horizontal length, in another embodiment, the horizontal length may be different from each other depending on the front and next letters.

After configuring the font "T" 531, the first space 541, the font "O" 532, the second space 542, the space font 533, and the third space 543, the electronic apparatus 101 may determine that a font "J" 535 cannot be configured for the remaining area 534. More specifically, the electronic apparatus 101 may identify that the horizontal length (x1) of the font "J" is greater than the horizontal length (x4) of the remaining area 534. According to this, the electronic apparatus 101 may dispose the font "J" 535 and the font "B" 536 on the next line. The electronic apparatus 101 may determine a line space (q1) base on the line space information of the second font, and may create a fifth space 544, a sixth space 545, a seventh space 546, a eighth space 547, the ninth space 548, the tenth space 549, and an eleventh space 550, based on the determined line space (q1).

As described above, the electronic apparatus 101 may create the fonts 531, 532, 533, 535, and 536, and the spaces 541 to 552 on the basis of the second font attributes, and may obtain the second configuration data according thereto. Here, the fonts 531, 532, 533, 535, and 536, the spaces 541 to 552, and the remaining areas 534, 537, 538, and 553 may be referred to as a second layout. That is, the layout may include all of the fonts and spaces of the configuration based on a specific font, and the remaining areas corresponding to the fonts or spaces.

In operation 430, the electronic apparatus 101 may determine whether or not the difference between the first configuration and the second configuration exceeds a critical value. In an embodiment, the electronic apparatus 101 may compare the first layout attribute of the first configuration with the second layout attribute of the second configuration. For example, the electronic apparatus 101 may compare the difference between the height (h1) of the first layout and the height (y1+y2) of the second layout with the critical value. The electronic apparatus 101 may determine whether or not the difference (|y1+y2−h1|) between the first layout attribute and the second layout attribute is greater than critical value.

If the difference between the first configuration and the second configuration is greater than the predetermined critical value, the electronic apparatus 101 may change the second configuration into the third configuration to be displayed, wherein the difference between the first configuration and the third configuration is equal to or less than the predetermined critical value.

Referring to FIG. 5C, the electronic apparatus 101 may adjust the second font attributes in order to thereby configure the third configuration. For example, the electronic apparatus 101 may create a font "T" 561 by using the second font. The electronic apparatus 101 may adjust the predetermined width (d1) of the letter "T" among the attributes of the second font in order to thereby create the font "T" 561 that has the adjusted width (X1). In a similar manner, the electronic apparatus 101 may create fonts 562, 563, 564, and 565 that have the adjusted width (X2), (X3), (X4), or (X5), respectively. For example, X1 may be less than d1, and thus the font corresponding to the data "TO JB" may be arranged in the resource available for the font without line changes.

In an embodiment of the present disclosure, the electronic apparatus 101 may adjust the kerning among the second font attributes in order to thereby configure the space between fonts to be zero. Accordingly, the electronic apparatus may exclude the spaces 541 to 552 of FIG. 5B from the third configuration.

In an embodiment of the present disclosure, the electronic apparatus 101 may adjust the height of the second font attributes in order to thereby create the fonts 561, 562, 563, 564, and 565 that have the adjusted height (Y1).

The electronic apparatus 101 may determine whether or not the difference between the first configuration and the third configuration is greater than a predetermined critical value. For example, the electronic apparatus 101 may compare the difference between the height (h1) of the first layout and the heights (Y1) of the third layout with the critical value. The electronic apparatus 101 may determine whether or not the difference (|Y1−h1|) between the first layout attribute and the second layout attribute is greater than the critical value.

If the difference between the first configuration and the second configuration is less than or equal to the predetermined critical value, in operation 440, the electronic apparatus 101 may display the layout of the second configuration.

According to the description above, the electronic apparatus 101 may display the layout similar to that of the configuration of the first font even when using the second font. Although the electronic apparatus 101 is described to adjust the attributes of the second font such as width, height or kerning; in the embodiment above, this is only an example, and the adjustment of various font attributes will be described later in more detail. In addition, the electronic apparatus 101 may share the attribute adjustment information of the second font with other electronic apparatuses through a network. Therefore, electronic apparatuses of the same model as the electronic apparatus 101 may directly display the adjusted configuration by using the shared font attribute information without the above-mentioned procedure.

Figure 6:
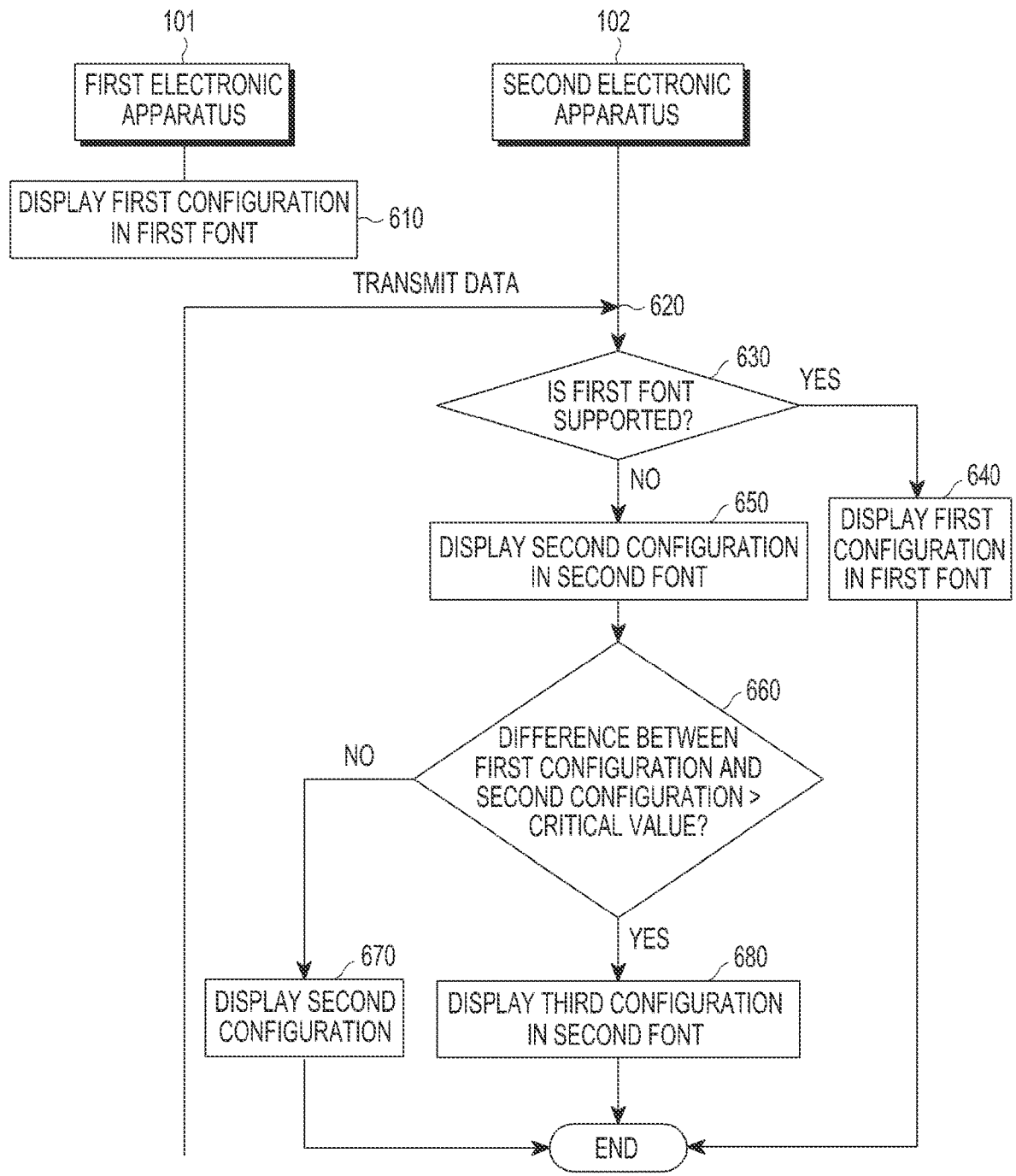
FIG. 6 is a flowchart for explaining an operation of an electronic apparatus, according to various embodiments of the present disclosure.

FIG. 6 is a flowchart illustrating an operation of an electronic apparatus, according to various embodiments of the present disclosure. The embodiment of FIG. 6 will be described in more detail with reference to FIGS. 7Aa and 7Bb.

Figure 7A:
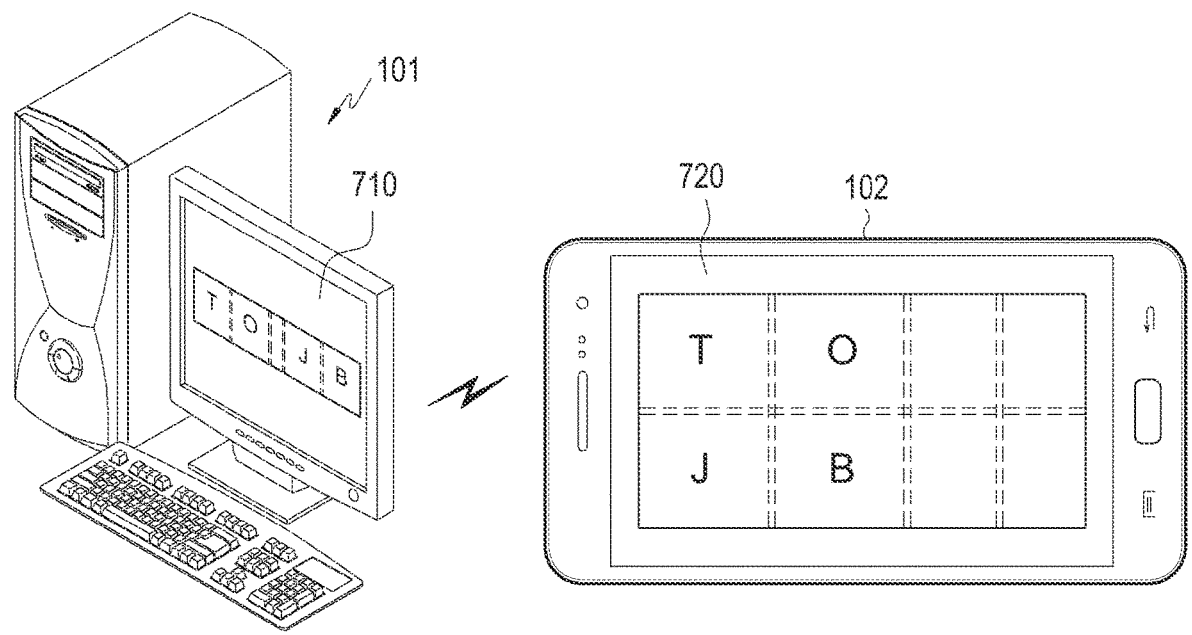
FIGS. 7A and 7B illustrate conceptual diagrams for explaining a screen configuration in a plurality of electronic apparatuses, according to various embodiments of the present disclosure.
Figure 7B:
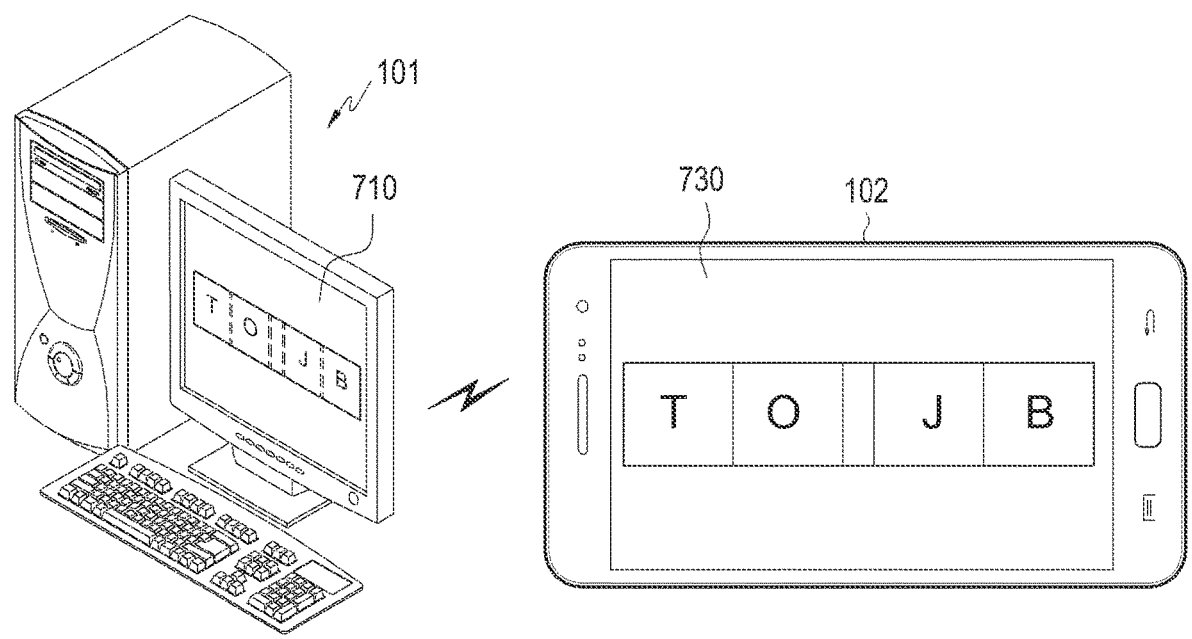

FIGS. 7A and 7B illustrate conceptual diagrams for explaining screen configurations of a plurality of electronic apparatuses, according to various embodiments of the present disclosure.

Referring to FIGS. 6, 7A and 7B, in operation 610, a first electronic apparatus 101 may display the data in a first configuration 710 of a first font. For example, as shown in FIG. 7A, the first electronic apparatus 101 may be a desktop computer, and a second electronic apparatus 102 may be a mobile electronic apparatus. Although the first electronic apparatus 101 and the second electronic apparatus 102 are described to be the desktop computer and the mobile electronic apparatus, respectively, the present disclosure is not limited thereto, and it is obvious to those skilled in the art that electronic apparatuses that may display the configuration according to various embodiments of the present disclosure may be adopted.

For example, the first electronic apparatus 101 may execute a word processing application, and may display the data in a first configuration 710 by using the first font. The first configuration 710 may be configured based on first font attributes, and may include a first layout.

In operation 620, the first electronic apparatus 101 may transmit the data to the second electronic apparatus 102. The first electronic apparatus 101 may make a wired or wireless communication connection with the second electronic apparatus 102, and the first electronic apparatus 101 I may transmit/receive data to/from the second electronic apparatus 102. Here, the data may include information stating that the data has been created based on the first font, as well as information related to the content of the alphabet. In addition, the data may further include the attributes of the first layout based on the first font.

In operation 630, the second electronic apparatus 102 may determine whether or not the first font is supported. The second electronic apparatus 102, for example, may determine whether or not the first font is included in the fonts that are pre-stored in the second electronic apparatus 102, based on the information stating that it has been created on the basis of the first font, which is received in operation 620.

In the case where the second electronic apparatus 102 supports the first font, in operation 640, the second electronic apparatus 102 may display the first configuration in the first font. Since the second electronic apparatus 102 configures the received data based on the first font attributes, the second electronic apparatus 102 may display the same layout as the first electronic apparatus 101.

If the second electronic apparatus 102 does not support the first font, in operation 650, the second electronic apparatus 102 may create a second configuration 720 by using the second font. In an embodiment, the second electronic apparatus 102 may determine the second font related to the first font. The second font may be determined to be the font of which the similarity with the first font is equal to or greater than a predetermined value. For example, the first font attribute, such as size, width, height, a height-to-width ratio, kerning, or line space, is compared with the second font attribute, and the font, of which the difference of the font attribute is equal to or greater than the predetermined value, may be determined to be the second font.

The second electronic apparatus 102 may create the second configuration 720 based on the predetermined second font attributes.

Referring to FIG. 7A, the second electronic apparatus 102 may create and display the second configuration 720 based on the second font. The operation in which the second electronic apparatus 102 displays the second configuration 720 as shown in FIG. 7A is an example only, and the second electronic apparatus 102 may create the second configuration 720, but may not display the same.

In operation 660, the second electronic apparatus 102 may determine whether or not the difference between the first configuration 710 and the second configuration 720 is greater than a critical value. For example, the second electronic apparatus 102 may compare the first layout attribute of the first configuration 710 with the second layout attribute of the second configuration 720. As described above, the second electronic apparatus 102 may receive the first layout attribute from the first electronic apparatus 101. In an embodiment, the second electronic apparatus 102 may compare the difference between the height of the first layout and the height of the second layout with a critical value.

In operation 670, if the difference between the first configuration 710 and the second configuration 720 is equal to or less than the critical value, the second electronic apparatus 102 may display the second configuration 720 on the display.

In operation 680, if the difference between the first configuration 710 and the second configuration 720 is greater than the critical value, the second electronic apparatus 102 may display a third configuration 730 that is made by adjusting the second configuration 720. For example, as shown in FIG. 7B, the second electronic apparatus 102 may display the third configuration 730 that is made by adjusting the font width, height, or kerning of the second configuration 720.

The second electronic apparatus 102 may further determine whether or not the difference between the third configuration 730 and the first configuration 710 is greater than the critical value. If the difference between the third configuration 730 and the first configuration 710 is equal to or less than the critical value, the second electronic apparatus 102 may display the third configuration 730. If the difference between the third configuration 730 and the first configuration 710 is greater than the critical value, the second electronic apparatus 102 may re-adjust the font attributes.

According to the description above, the second electronic apparatus 102 may display the third configuration 730 that is similar to the first configuration 710 and of the first electronic apparatus 101. In another embodiment, the second electronic apparatus 102 may display the second configuration 720, and may display a window that inquire about whether or not the font attribute is to be changed. When the font attribute changing command is received from the user, the second electronic apparatus 102 may change the second configuration 720 into the third configuration 730, and may display the same.

Figure 8:
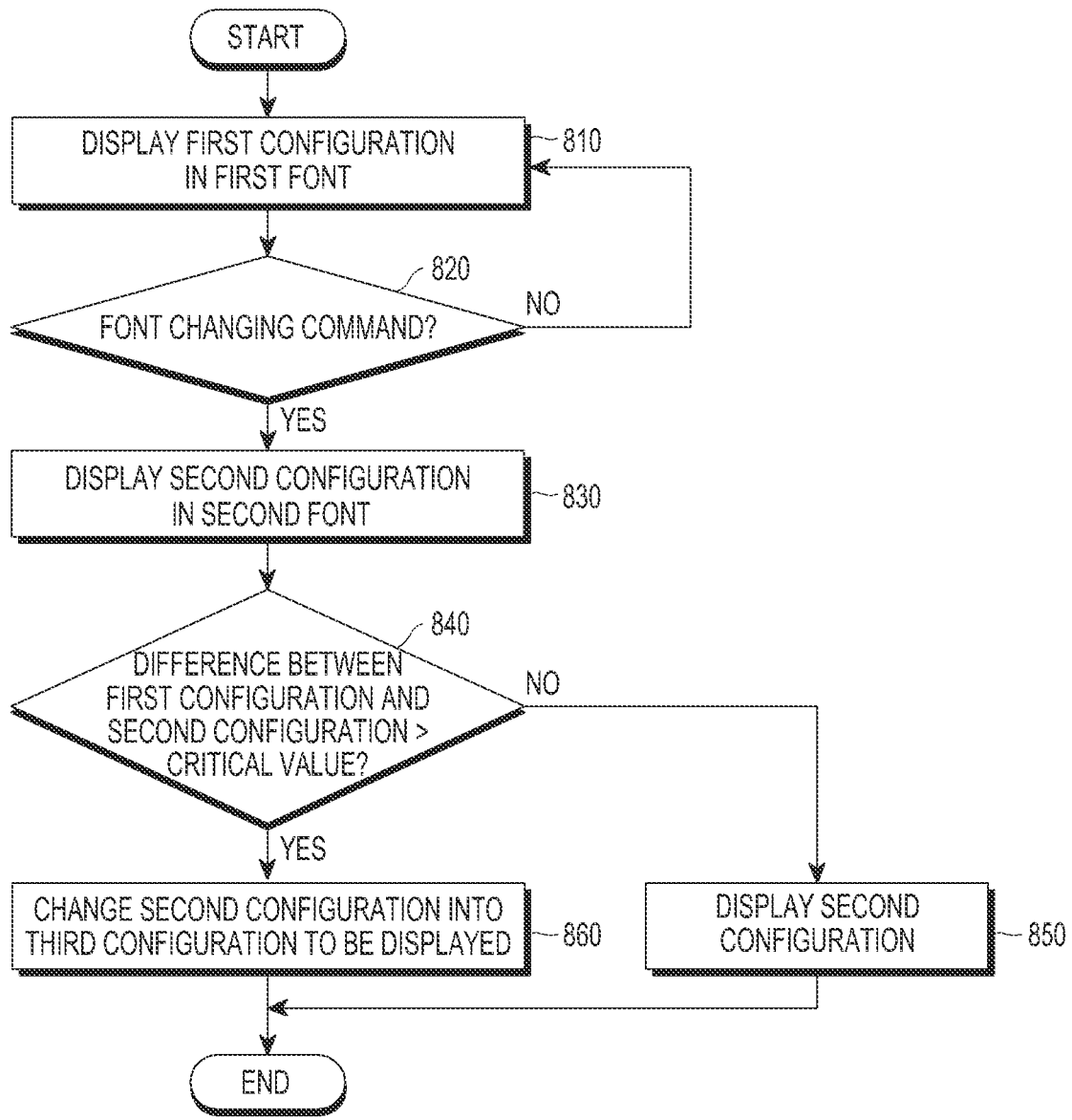
FIG. 8 is a flowchart for explaining an operation of an electronic apparatus, according to various embodiments of the present disclosure.

FIG. 8 is a flowchart for explaining an operation of the electronic apparatus, according to various embodiments of the present disclosure. The embodiment of FIG. 8 will be described in more detail with reference to FIGS. 9A to 9E.

FIGS. 9A to 9E illustrate conceptual diagrams of a screen configuration of an electronic apparatus, according to various embodiments of the present disclosure.

Figure 9A:
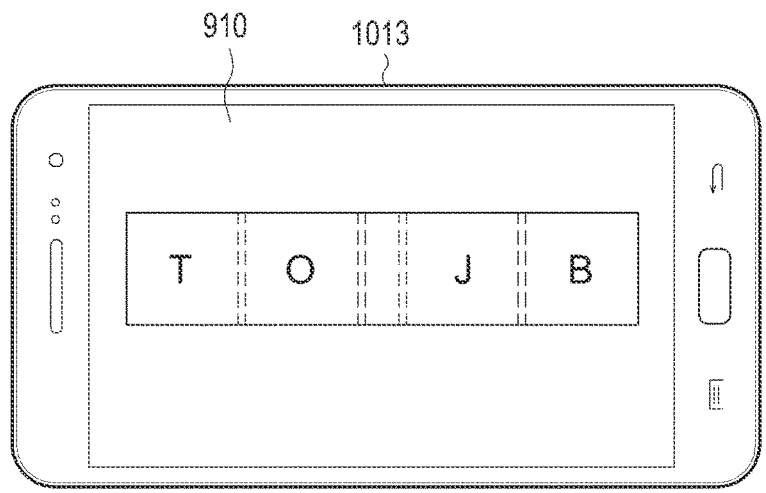
FIGS. 9A to 9E illustrate conceptual diagrams of a screen configuration of an electronic apparatus, according to various embodiments of the present disclosure.

Referring to FIGS. 8 and 9A to 9E, in operation 810, a first electronic apparatus 101 may display the data in the first configuration by using a first font. For example, as shown in FIG. 9A, the first electronic apparatus 101 may display letter data "TO JB" in a first configuration 910 that is configured by using the first font. The first electronic apparatus 101 may display the first configuration 910 based on the font attributes of the first font.

Figure 9B:
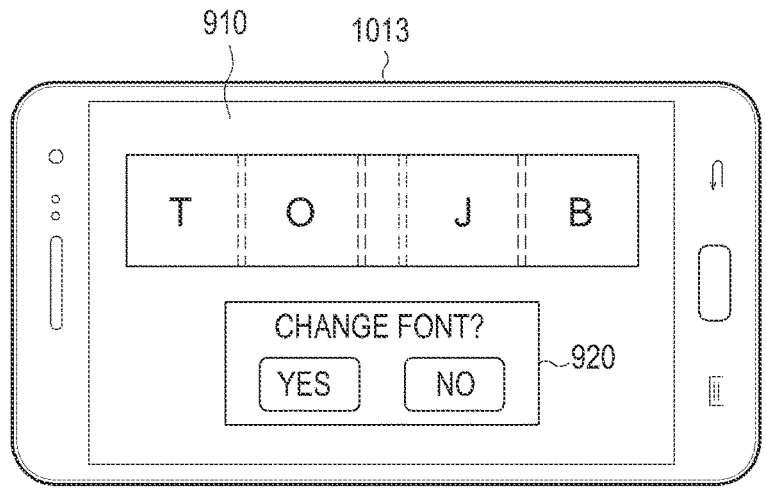

In operation 820, the first electronic apparatus 101 may obtain a font changing command. For example, the first electronic apparatus 101 may display an inquiry window 920 that inquires about whether or not the font is to be changed as shown in FIG. 9B. The inquiry window 920 may be a user interface that receives a user input, and may include a plurality of function keys. The user may designate a function key corresponding to the font change in order to thereby input the font changing command into the first electronic apparatus 101. Although it is not shown in the drawing, the inquiry window 920 may further include changeable fonts, and the user may further designate one of the changeable fonts.

Figure 9C:
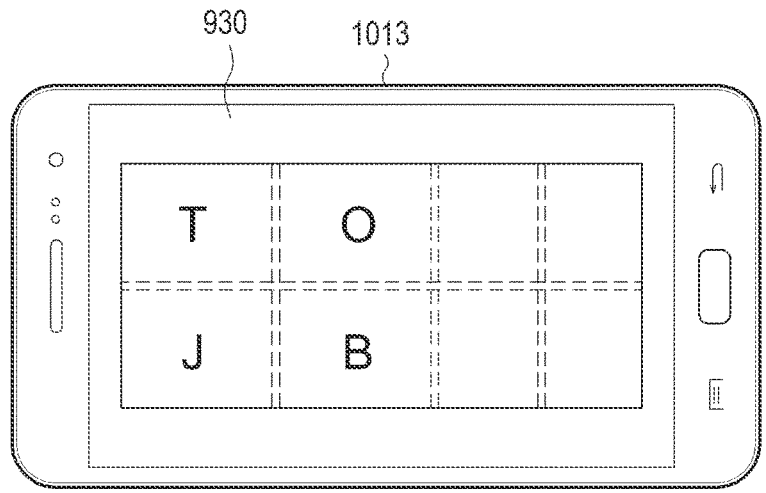

In operation 830, the first electronic apparatus 101 may create a second configuration in a second font. For example, the first electronic apparatus 101 may create a second configuration 930 as shown in FIG. 9C. Although the second configuration 930 is displayed in FIG. 9C, this is only an example, and the first electronic apparatus 101 may not display the second configuration 930.

In operation 840, the first electronic apparatus 101 may determine whether or not a difference between the first configuration 910 and the second configuration 930 is greater than a critical value. In operation 850, if the difference between the first configuration 910 and the second configuration 930 is equal to or less than the critical value, the first electronic apparatus 101 may display the second configuration 930.

Figure 9D:
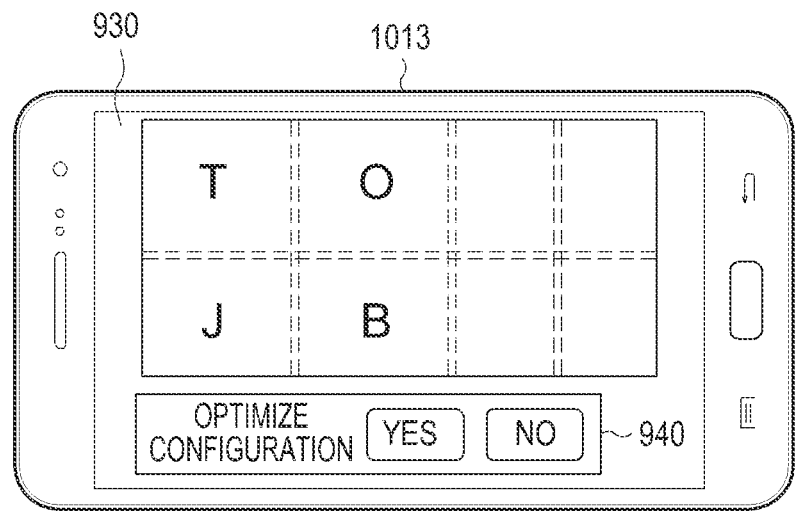
Figure 9E:
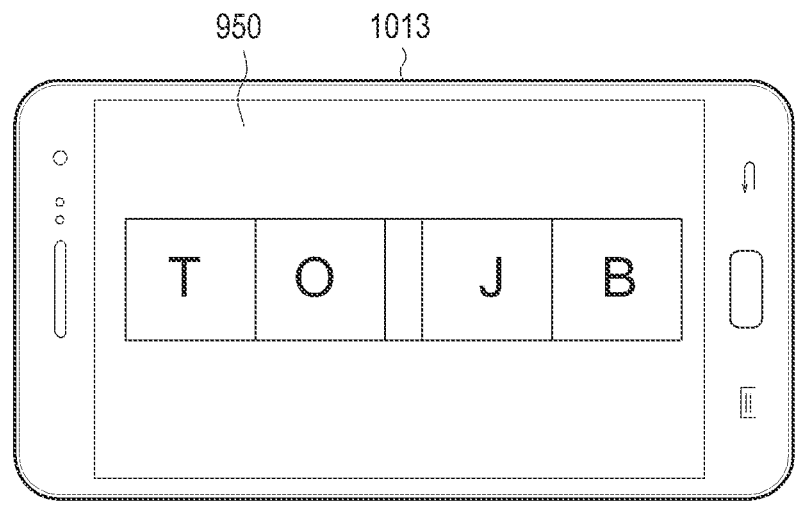

In operation 860, the difference between the first configuration 910 and the second configuration 930 is greater than the critical value, the first electronic apparatus 101 may display a third configuration 950 that is made by adjusting the second configuration 930 as shown in FIG. 9E. In another embodiment, the first electronic apparatus 101 may further display an inquiry window 940 that inquires about whether or not the configuration is to be optimized while displaying the second configuration 930 as shown in FIG. 9D. The inquiry window 940 may be a user interface that receives a user input, and may include a plurality of function keys. The user may designate a function key corresponding to the font changing command in order to thereby input a configuration optimization command into the first electronic apparatus 101.

The first electronic apparatus 101 may change the second configuration 930 into the third configuration 950 by adjusting the font attributes of the second font. The third configuration 950 may be the configuration of which the difference from the first configuration 910 is equal to or less than the critical value. Therefore, even if the font is changed according to the font changing command, the first electronic apparatus 101 may display the layout that is similar to the initial font.

Figure 10:
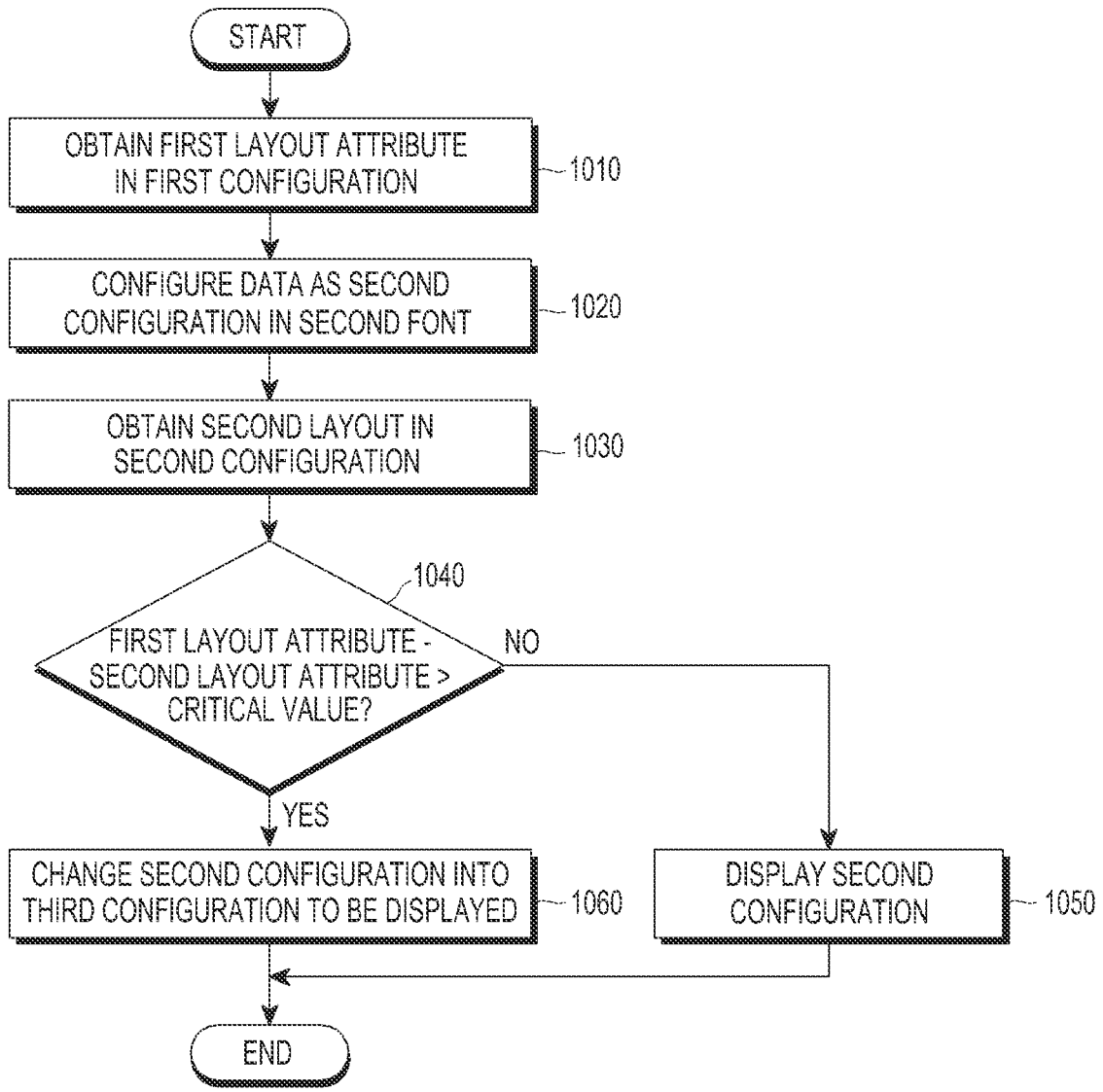
FIG. 10 is a flowchart for explaining an operation of an electronic apparatus, according to various embodiments of the present disclosure.

FIG. 10 is a flowchart for explaining an operation of the electronic apparatus, according to various embodiments of the present disclosure.

Referring to FIG. 10, in operation 1010, the first electronic apparatus 101 may obtain a first layout attribute of the first configuration. The first electronic apparatus 101 may receive data and the first layout attributes from another electronic apparatus. In another embodiment of the present disclosure, the first electronic apparatus 101 may obtain the first layout attributes based on first font attributes that are pre-stored in the first electronic apparatus 101.

The layout attribute may be the information that is related to the form of the layout that includes fonts, space, and the remaining areas of the configuration of a specific font. For example, the layout attributes may include at least one of the width, height, area, and a width-height ratio of the layout.

In operation 1020, the first electronic apparatus 101 may configure the data in a second configuration by using a second font. The first electronic apparatus 101 may include the attributes of the second font, and may create the second configuration based on the font attributes. Furthermore, in operation 1030, the first electronic apparatus 101 may obtain the attributes of the second layout for the second configuration.

In operation 1040, the first electronic apparatus 101 may determine whether or not a difference between the first layout attribute and the second layout attribute is greater than a critical value. In an embodiment, the first electronic apparatus 101 may determine whether or not the difference between a height of the first layout and a height of the second layout is greater than a critical value.

In operation 1050, if the difference between the first layout attribute and the second layout attribute is less than or equal to the critical value, the first electronic apparatus 101 may display the second configuration. That is, the first electronic apparatus 101 may determine that the first layout and the second layout are similar to each other, and thus may display the second configuration similar to the first configuration.

In operation 1060, when the difference between the first layout attribute and the second layout attribute is greater than the critical value, the first electronic apparatus 101 may change the second configuration into a third configuration to then be displayed. In an embodiment, the first electronic apparatus 101 may change the second configuration into the third configuration by adjusting the font attributes of the second font.

Figure 11:
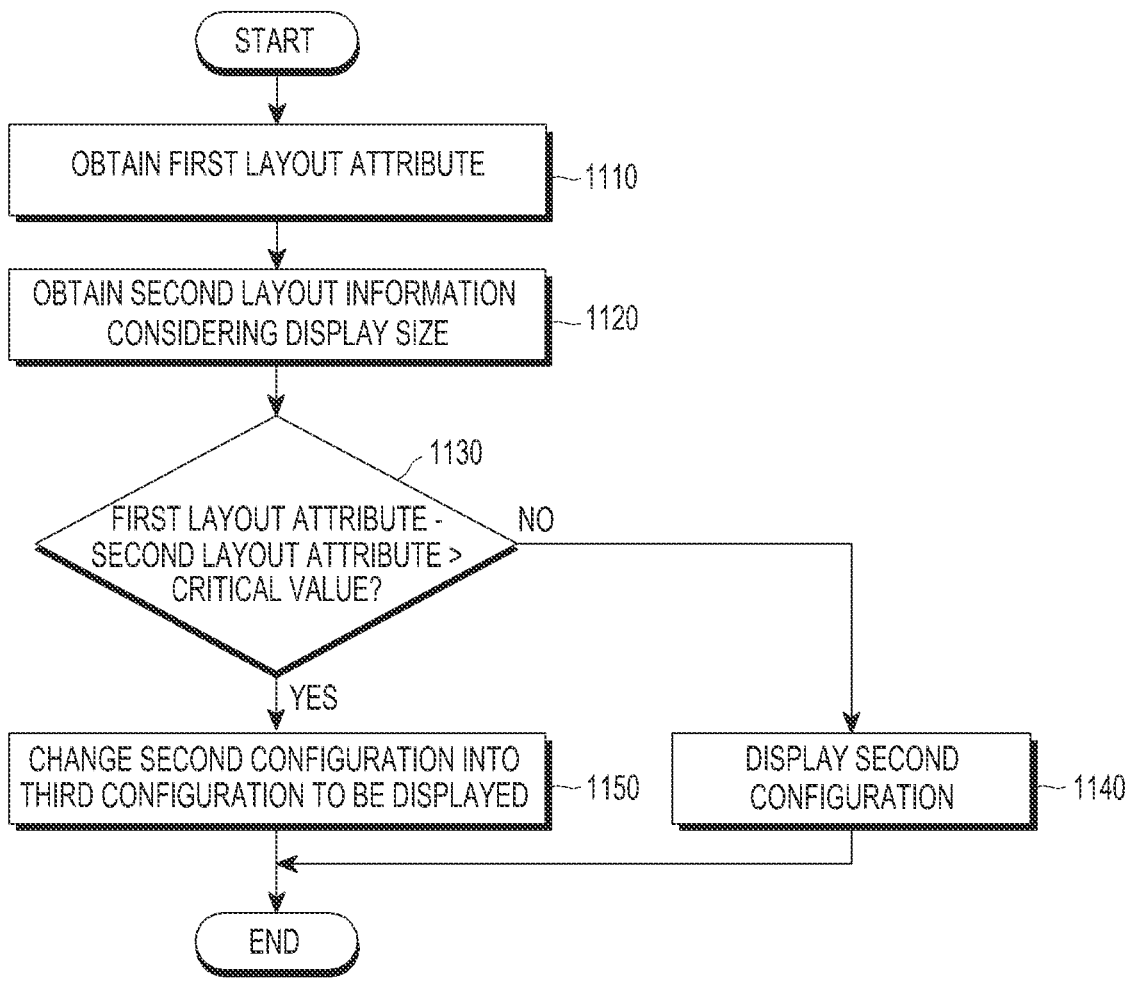
FIG. 11 is a flowchart of an operation of an electronic apparatus, according to various embodiments of the present disclosure.

FIG. 11 is a flowchart of an operation of an electronic apparatus, according to various embodiments of the present disclosure. The embodiment of FIG. 11 will be described in more detail with reference to FIGS. 12A to 12C.

Figure 12A:
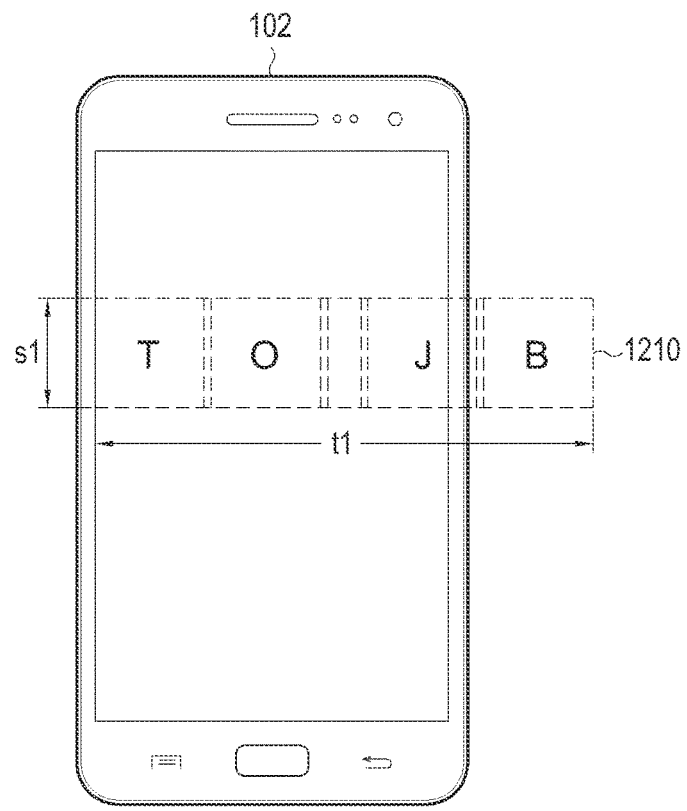
FIGS. 12A to 12C illustrate conceptual diagrams of a screen configuration of an electronic apparatus, according to various embodiments of the present disclosure.
Figure 12B:
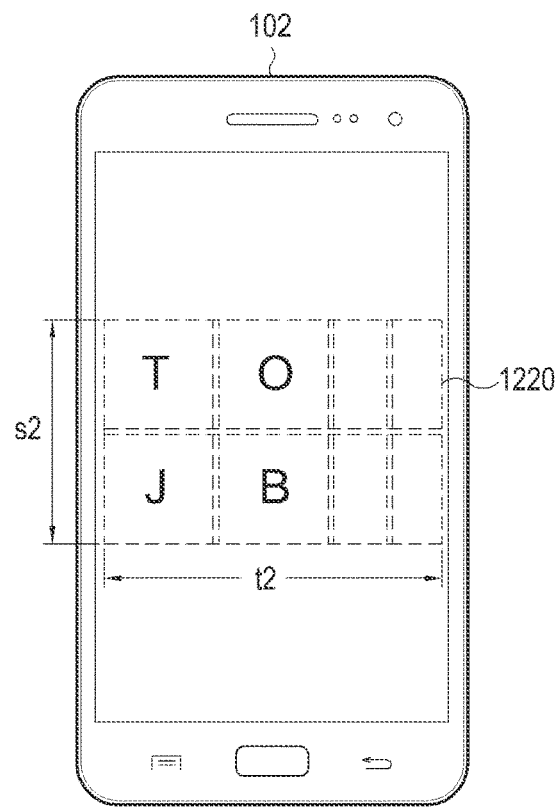
Figure 12C:
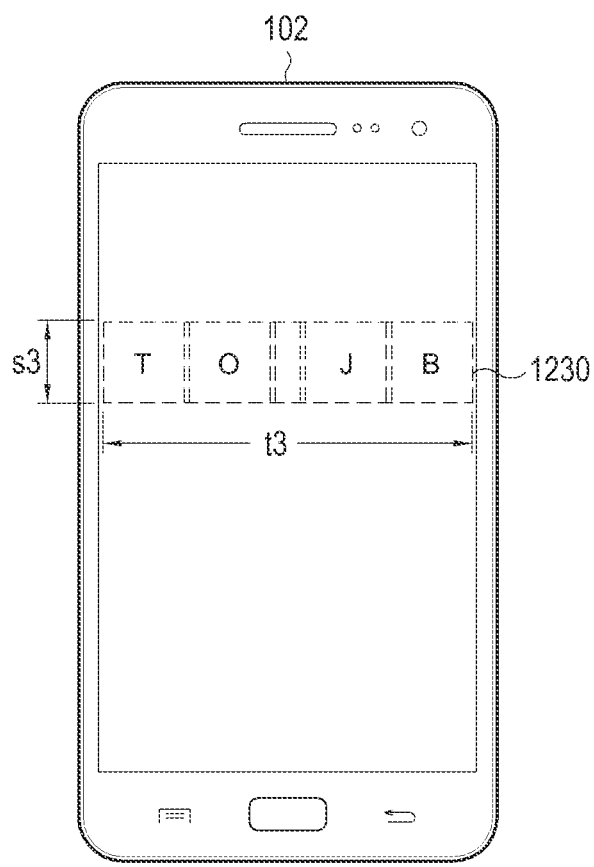

FIGS. 12A to 12C show conceptual diagrams of a screen configuration of an electronic apparatus, according to various embodiments of the present disclosure.

Referring to FIGS. 11 and 12A to 12C, in operation 1110, a second electronic apparatus 102 may obtain attributes of a first layout. For example, it is assumed that the second electronic apparatus 102 receives data from a first electronic apparatus 101. The second electronic apparatus 102 may obtain the attributes of the first layout based on a first font from the first electronic apparatus 101 as well. It is assumed that the second electronic apparatus 102 supports the first font.

In operation 1120, the second electronic apparatus 102 may create a second configuration in consideration of a size of a display to obtain an attribute of the second layout.

Referring to FIG. 12A, the second electronic apparatus 102 may create a first layout 1210 based on first font attributes. The second electronic apparatus 102 may determine the width and the height of the first layout 1210 to be t1, and s1, respectively, based on the first font attribute. The first layout 1210 may be the same as the layout in the first electronic apparatus 101. The second electronic apparatus 101 may determine a second layout 1220 to correspond to the size of the display. The second electronic apparatus 101 may determine a width and a height of the second layout 1220 to be t2, and s1, respectively, so that the width t2 of the second layout 1220 is smaller than a width of the display.

In operation 1130, as shown in FIG. 12B, the second electronic apparatus 102 may determine whether or not a difference between the attribute of the second layout 1220 corresponding to the size of the display and the first layout attribute of the first electronic apparatus 101 is greater than a critical value.

If the difference between the attribute of the second layout 1220 and the first layout attribute of the first electronic apparatus 101 is greater than the critical value, in operation 1140, the second electronic apparatus 102 may display the second layout 1220 (that is, the second configuration).

If the difference between the attribute of the second layout 1220 and the first layout attribute of the first electronic apparatus 101 is less than or equal to the critical value, in operation 1150, the second electronic apparatus 102 may display a third layout 1230 that is obtained by adjusting the second font attributes. For example, as shown in FIG. 12C, the second electronic apparatus 102 may reduce the size of the second font in order to thereby display the third layout 1230 that has a width of t3 and a height of s3, which is similar to the first layout of the first electronic apparatus 101.

Figure 13:
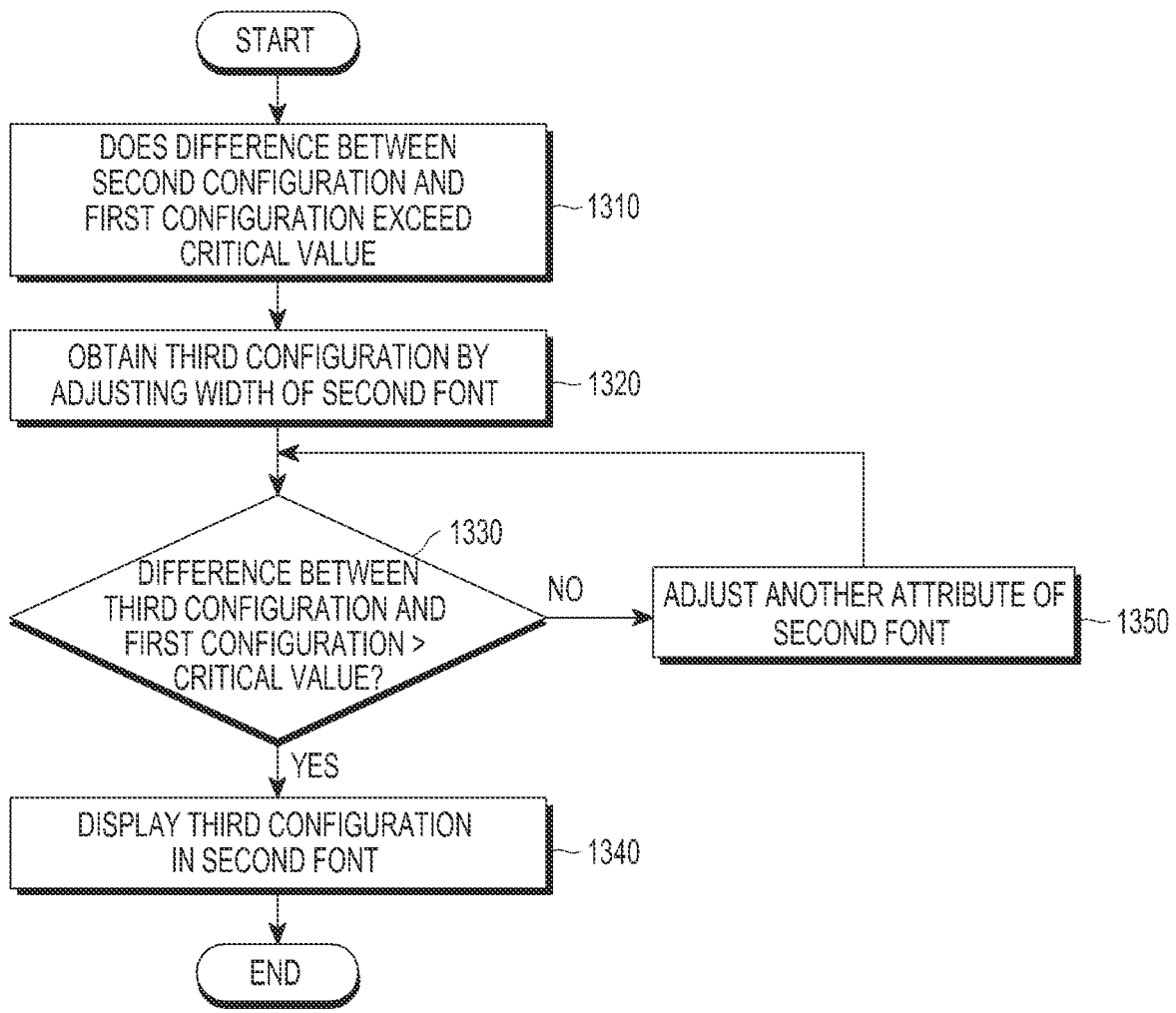
FIG. 13 is a flowchart for explaining a font-attribute adjustment, according to various embodiments of the present disclosure.

FIG. 13 is a flowchart for explaining a font attribute adjustment, according to various embodiments of the present disclosure. The embodiment of FIG. 13 will be described in more detail with reference to FIG. 14.

Figure 14:
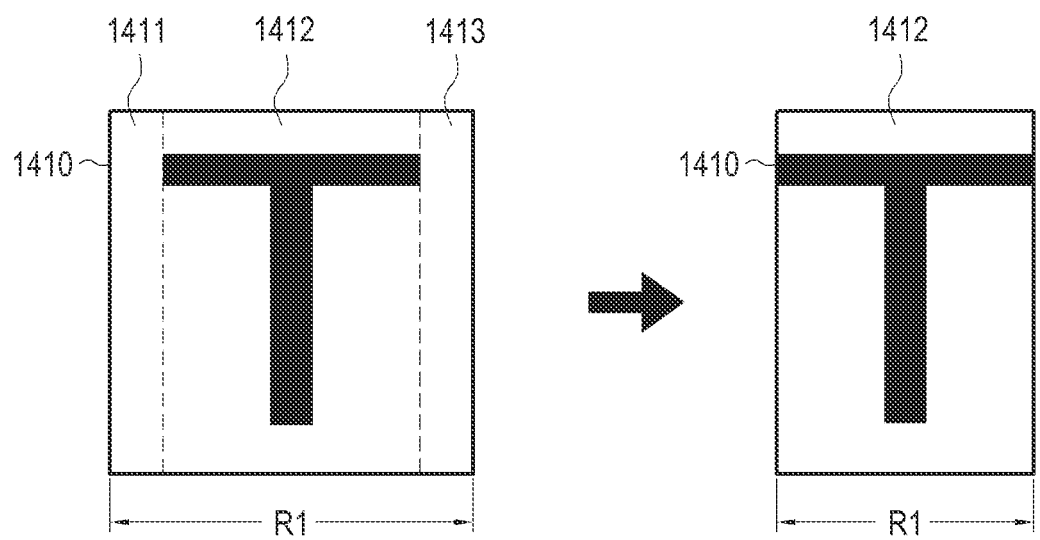
FIG. 14 illustrates a conceptual diagram for explaining a font-width adjustment, according to various embodiments of the present disclosure.

FIG. 14 illustrates a conceptual diagram for explaining a font width adjustment, according to various embodiments of the present disclosure.

Referring to FIGS. 13 and 14, in operation 1310, a first electronic apparatus 101 may determine whether or not a difference between a second configuration and a first configuration exceeds a critical value. The first configuration may be configured on the basis of a first font, and the second configuration may be configured on the basis of a second font.

In operation 1320, the first electronic apparatus 101 may obtain the third configuration by adjusting a width of the second font. For example, as shown in FIG. 14, the first electronic apparatus 101 may adjust the width of a font "T" 1410 based on a predetermined attribute of the second font (that is, a predetermined width) in order to thereby create an adjusted font "T" 1412. The adjusted font "T" 1412 may have a width of R2, and R2 may be less than R1. More specifically, the font "T" 1410, which is based on the predetermined attribute of the second font, may have the width of R1. The first electronic apparatus 101 may select only the area 1412 except for the areas 1411 and 1413 of the font "T" 1410 in order to thereby create the width-adjusted font "T" 1412. The first electronic apparatus 101 may adjust the width in the same manner mentioned above to obtain the third configuration. Although the embodiment above describes only the reduction in the width, this is only an example, and the first electronic apparatus 101 may obtain a third configuration by increasing the width of the second font.

In operation 1330, the first electronic apparatus 101 may determine whether or not the difference between the third configuration and the first configuration is greater than a critical value. If the difference between the third configuration and the first configuration is less than or equal to the critical value, in operation 1340, the first electronic apparatus 101 may display the third configuration in the second font. If the difference between the third configuration and the first configuration is greater than the critical value, in operation 1350, the first electronic apparatus 101 may adjust another attribute of the second font. For example, the first electronic apparatus 101 may adjust the size of the second font. In another embodiment, the first electronic apparatus 101 may further adjust the adjusted attribute of the second font. For example, the first electronic apparatus 101 may further adjust the width of the second font.

Figure 15:
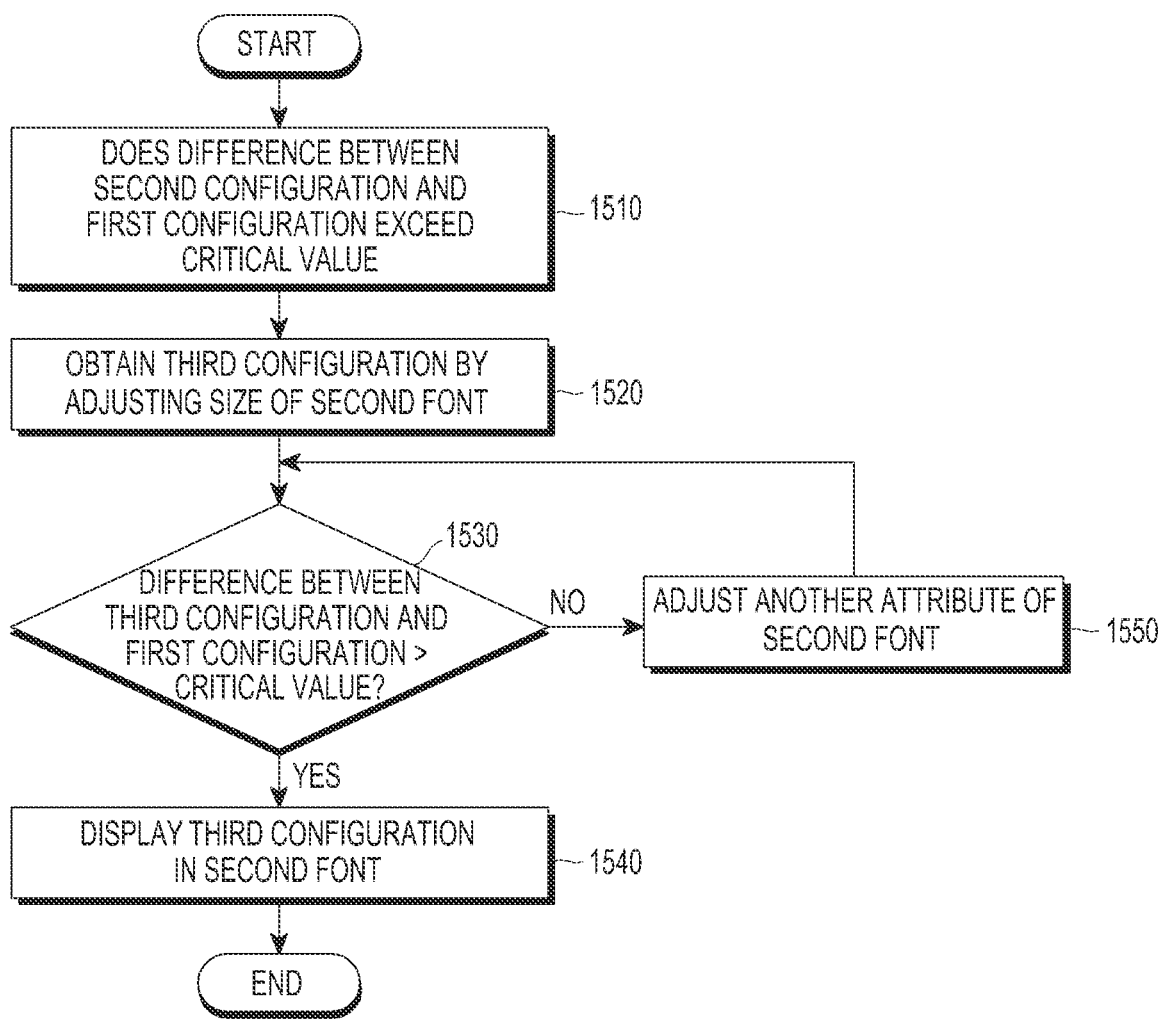
FIG. 15 is a flowchart for explaining a font-attribute adjustment, according to various embodiments of the present disclosure.

FIG. 15 is a flowchart illustrating a font attribute adjustment, according to various embodiments of the present disclosure. The embodiment of FIG. 15 will be described in more detail with reference to FIG. 16.

Figure 16:
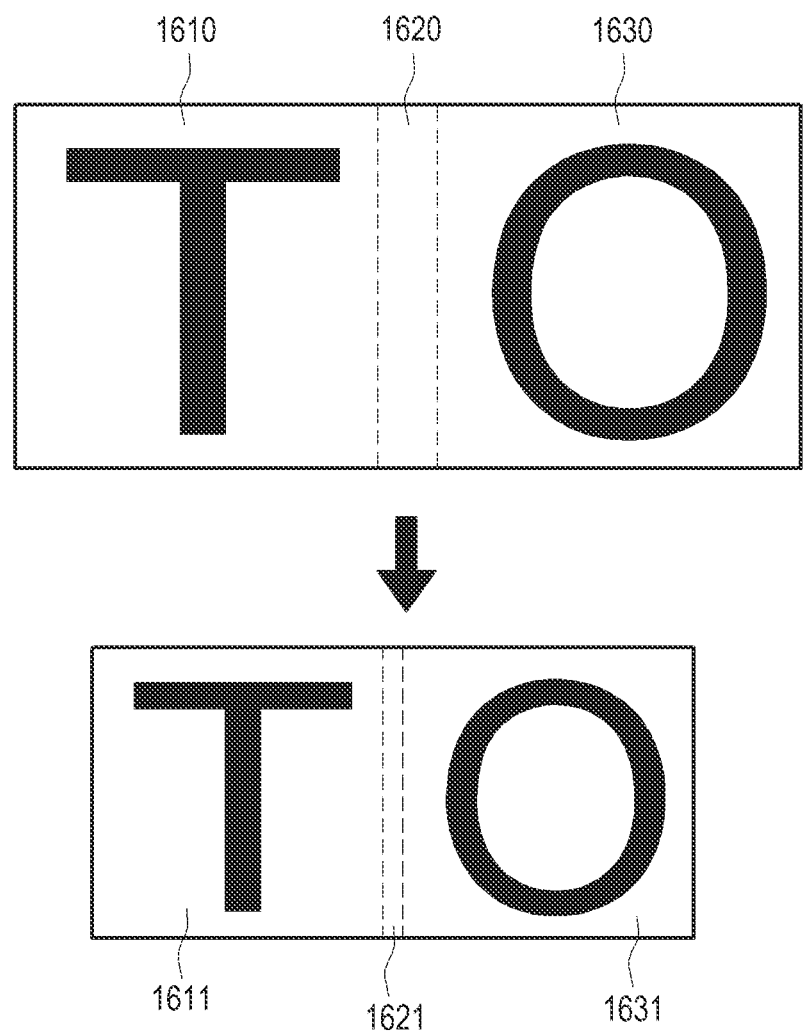
FIG. 16 illustrates a conceptual diagram for explaining a font-size adjustment, according to various embodiments of the present disclosure.

FIG. 16 shows a conceptual diagram illustrating a font size adjustment, according to various embodiments of the present disclosure.

Referring to FIGS. 15 and 16, in operation 1510, a first electronic apparatus 101 may determine whether or not a difference between a second configuration and a first configuration exceeds a critical value. Here, the first configuration may be configured based on a first font, and the second configuration may be configured based on a second font.

In operation 1520, the first electronic apparatus 101 may obtain the third configuration by adjusting the size of the second font. For example, as shown in FIG. 16, the first electronic apparatus 101 may adjust the size of a font "T" 1610, a space 1620, and the size of a font "O" 1630 based on a predetermined attribute of the second font (that is, a predetermined size) in order to thereby create an adjusted font "T" 1611, a space 1621, and a font "O" 1631. The adjusted font "T" 1611, space 1621, and the font "O" 1631 may be smaller than the font "T" 1610, the space 1620, and the font "O" 1630, respectively. The first electronic apparatus 101 may reduce the size to create the adjusted font while maintaining the width-to-height ratio. The first electronic apparatus 101 may adjust the size in the manner mentioned above in order to thereby obtain the third configuration. Although the embodiment above has described the reduction in the size, this is only an example, and the first electronic apparatus 101 may obtain the third configuration by increasing the size of the second font.

The operations 1530 to 1550 of FIG. 15 may be the same as the operations 1330 to 1350 of FIG. 13, respectively, and thus the description of the operations 1530 to 1550 will be omitted.

Figure 17:
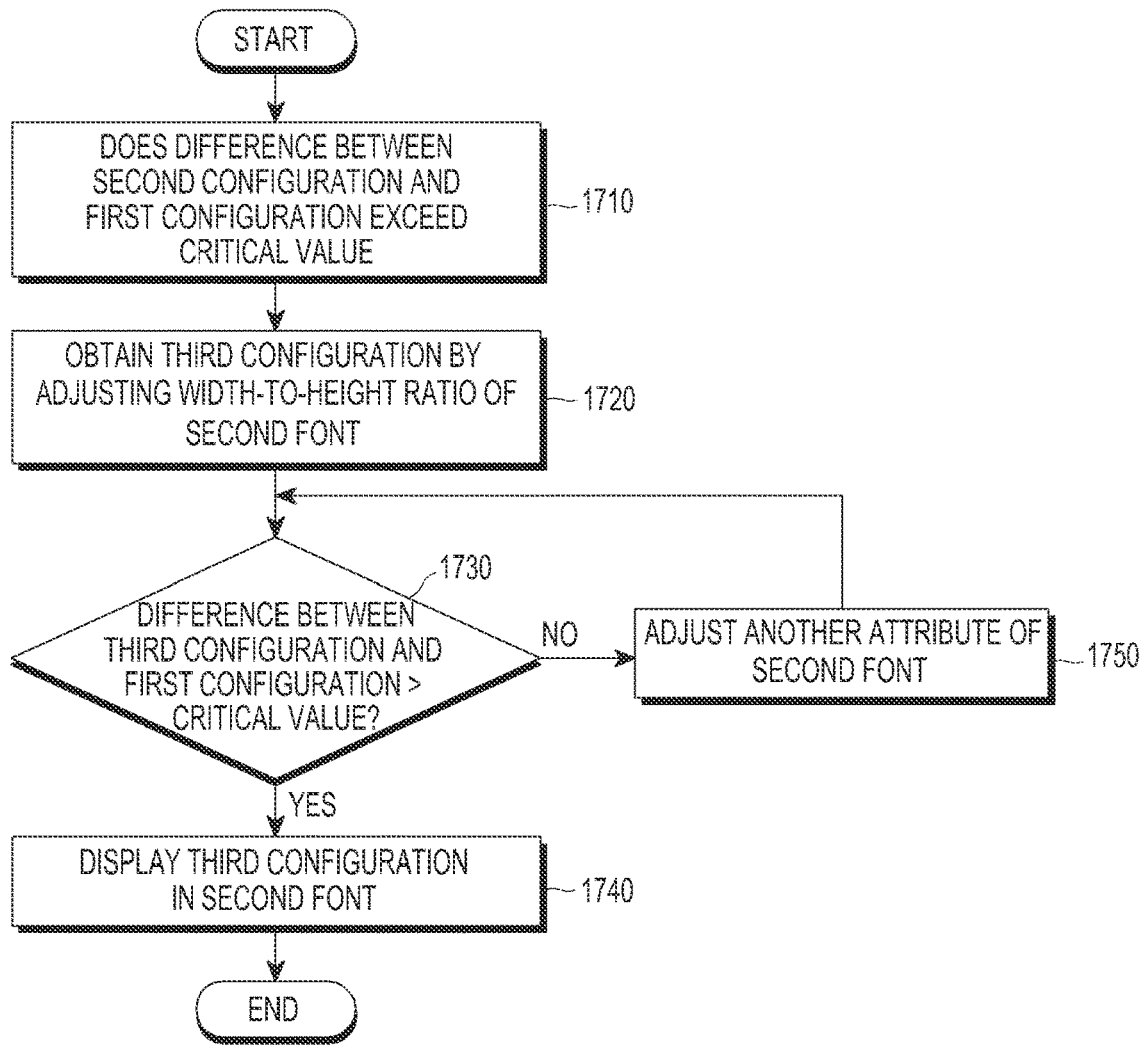
FIG. 17 is a flowchart for explaining a font-attribute adjustment, according to various embodiments of the present disclosure.

FIG. 17 is a flowchart illustrating a font attribute adjustment, according to various embodiments of the present disclosure. FIG. 17 will be described in more detail with reference to FIG. 18.

Figure 18:
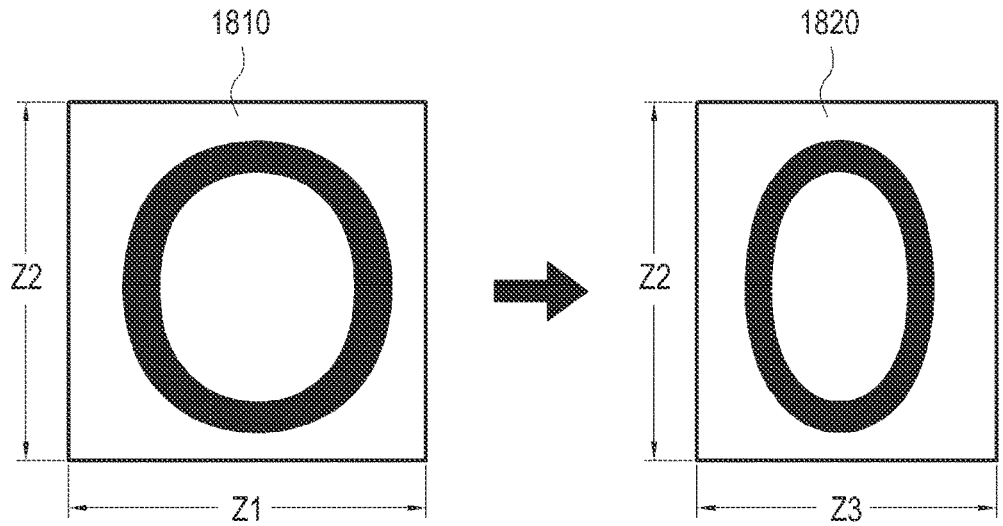
FIG. 18 illustrates a conceptual diagram for explaining a font-height-to-width ratio adjustment, according to various embodiments of the present disclosure.

FIG. 18 illustrates a conceptual diagram illustrating an adjustment of a height-to-width ratio of a font, according to various embodiments of the present disclosure.

Referring to FIG. 17, in operation 1710, the first electronic apparatus 101 may determine whether or not the difference between the second configuration and the first configuration exceeds a critical value. Here, the first configuration may be configured on the basis of the first font, and the second configuration may be configured on the basis of the second font.

In operation 1720, the first electronic apparatus 101 may adjust the height-to-width ratio of the second font in order to thereby obtain the third configuration. For example, as shown in FIG. 18, the first electronic apparatus 101 may adjust the size of a font "T" 1810 based on a predetermined attribute of the second font (that is, a predetermined height-to-width ratio) in order to thereby create an adjusted font "T" 1820. The width (z3) of the adjusted font "T" 1820 may be smaller than the width (z1) of the font "T" 1810. In addition, the height (z2) of the adjusted font "T" 1820 may be the same as the height (z2) of the font "T" 1810, and thus the height-to-width ratio of the adjusted font "T" 1820 may be different from the height-to-width ratio of the font "T" 1810. The first electronic apparatus 101 may adjust the height-to-width ratio in accordance with the above-described manner in order to thereby obtain the third configuration. Although the embodiment above describes only the reduction in the height-to-width ratio, this is only an example, and the first electronic apparatus 101 may obtain the third configuration by increasing the height-to-width ratio of the second font.

The operations 1730 to 1750 of FIG. 17 may be the same as the operations 1330 to 1350 of FIG. 13, and thus the description of the operations 1730 to 1750 may be omitted.

Figure 19:
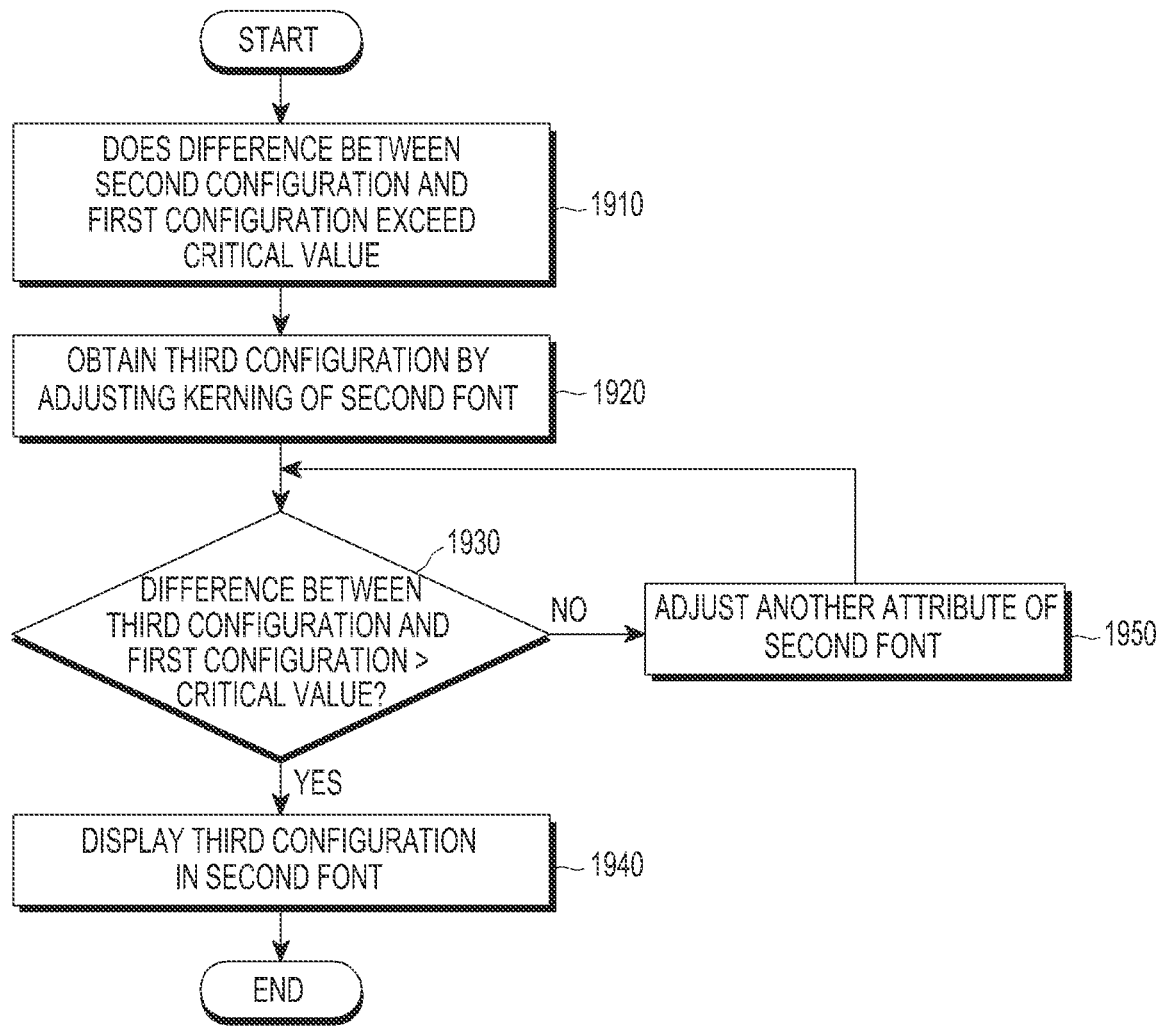
FIG. 19 is a flowchart for explaining a font-attribute adjustment, according to various embodiments of the present disclosure.

FIG. 19 is a flowchart illustrating a font attribute adjustment, according to various embodiments of the present disclosure. FIG. 19 will be described in more detail with reference to FIG. 20.

Figure 20:
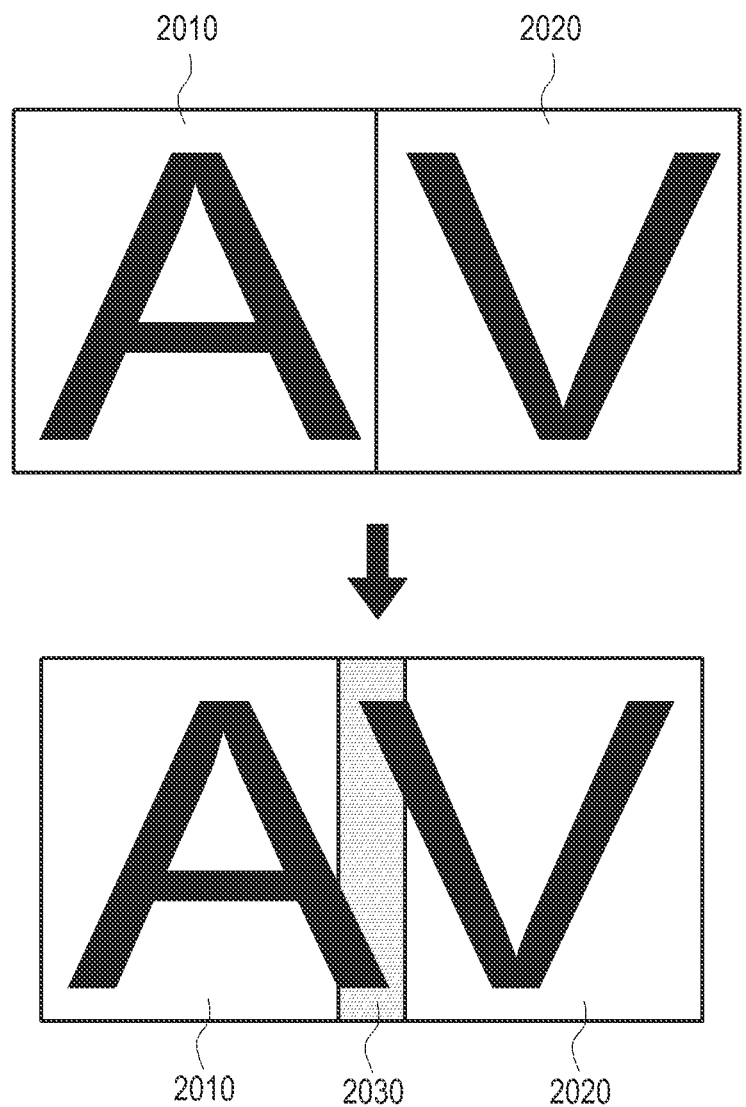
FIG. 20 illustrates a conceptual diagram for explaining a font-kerning adjustment, according to various embodiments of the present disclosure.

FIG. 20 illustrates a conceptual diagram illustrating a font kerning adjustment, according to various embodiments of the present disclosure.

Referring to FIGS. 19 and 20, in operation 1910, a first electronic apparatus 101 may determine whether or not a difference between a second configuration and a first configuration exceeds a critical value. Here, the first configuration may be configured on the basis of a first font, and the second configuration may be configured on the basis of a second font.

In operation 1920, the first electronic apparatus 101 may adjust a kerning of the second font in order to thereby obtain a third configuration. For example, as shown in FIG. 19, the first electronic apparatus 101 may configure a space between a font "A" 2010 and a font "V" 2020 based on a predetermined attribute of the second font (that is, a predetermined kerning). The first electronic apparatus 101 may adjust the kerning in order to thereby adjust the space between the font "A" 2010 and the font "V" 2020. An adjusted space 2030 between the font "A" 2010 and the font "V" 2020 may be less than the space according to the predetermined kerning. The first electronic apparatus 101 may adjust the kerning according to the above-described manner in order to thereby obtain the third configuration. Although the embodiment above has described the reduction in the space between the fonts according to the kerning adjustment, this is only an example, and the first electronic apparatus 101 may obtain the third configuration by increasing the space between the fonts.

The operations 1930 to 1950 of FIG. 19 may be the same as the operations 1330 to 1350 of FIG. 13, respectively, and thus the description of the operations 1930 to 1950 will be omitted.

Figure 21:
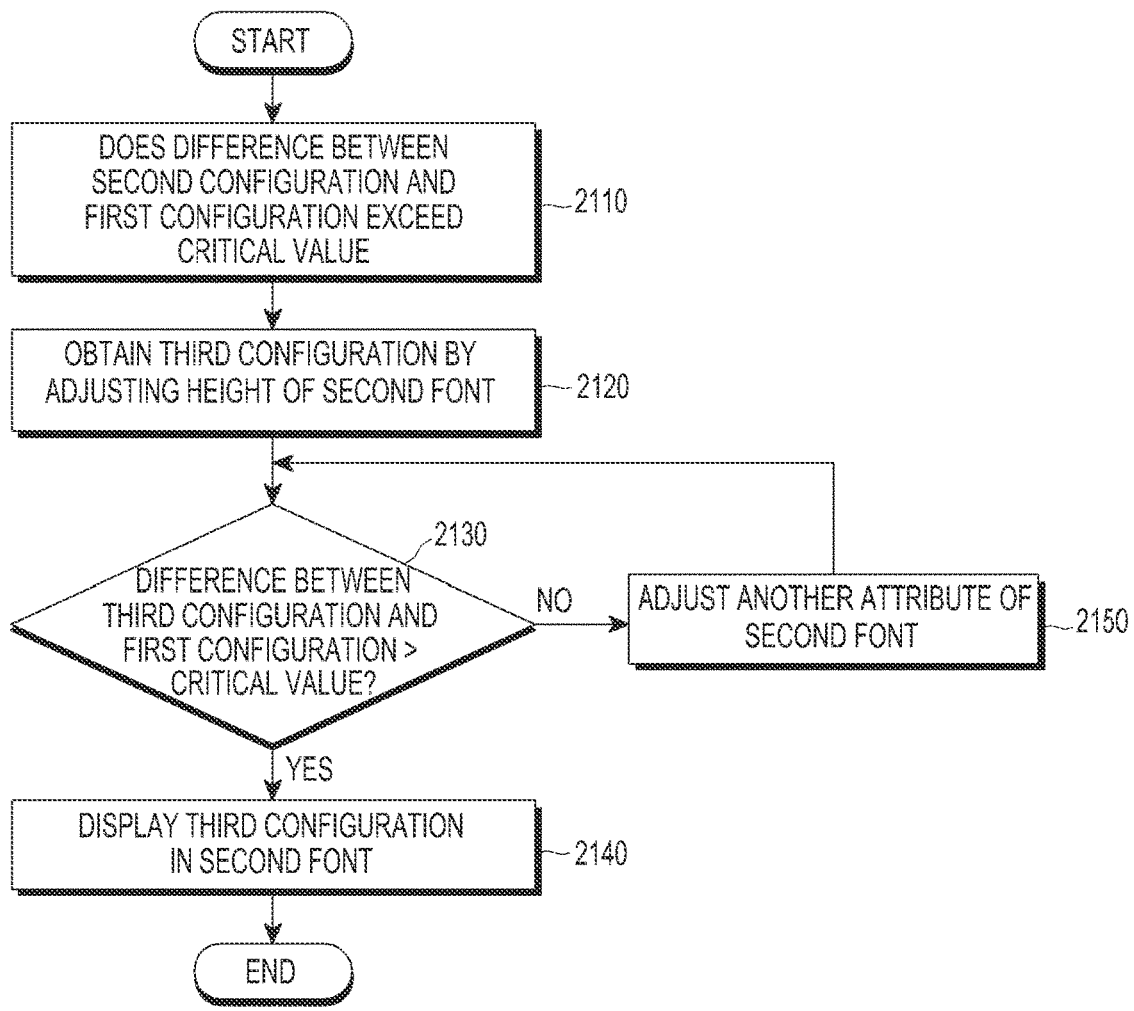
FIG. 21 is a flowchart for explaining a font-attribute adjustment, according to various embodiments of the present disclosure.

FIG. 21 is a flowchart illustrating a font attribute adjustment, according to various embodiments of the present disclosure. FIG. 21 will be described in more detail with reference to FIG. 22.

Figure 22:
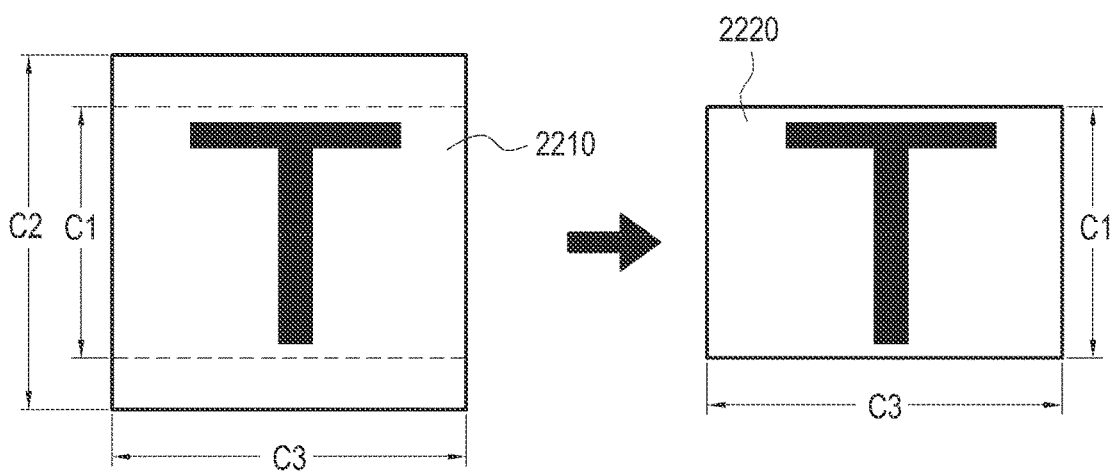
FIG. 22 illustrates a conceptual diagram for explaining a font-height adjustment, according to various embodiments of the present disclosure.

FIG. 22 shows a conceptual diagram illustrating a font height adjustment, according to various embodiments of the present disclosure.

Referring to FIGS. 21 and 22, in operation 2110, a first electronic apparatus 101 may determine whether or not a difference between a second configuration and a first configuration exceeds a critical value. Here, the first configuration may be configured on the basis of a first font, and the second configuration may be configured on the basis of a second font.

In operation 2120, the first electronic apparatus 101 may adjust a height of the second font in order to thereby obtain a third configuration. For example, as shown in FIG. 22, the first electronic apparatus 101 may adjust the height of a font "T" 2210 based on a predetermined attribute of the second font (that is, a predetermined height) in order to thereby create an adjusted font "T" 2220. The height (c1) of the adjusted font "T" 2220 may be less than the height (c2) of the font "T" 2010. In addition, the width (c3) of the adjusted font "T" 2220 may be the same as the height (c3) of the font "T" 2210, and thus the height of the adjusted font "T" 2220 may be different from the height of the font "T" 2210. The first electronic apparatus 101 may obtain the third configuration by adjusting the height according to the above-described manner. Although the embodiment above has described the reduction in the height, this is only an example, and the first electronic apparatus 101 may obtain the third configuration by increasing the height of the second font.

The operations 2130 to 2150 of FIG. 21 may be the same as the operations 1330 to 1350 of FIG. 13, respectively, and thus the description of the operations 2130 to 2150 will be omitted.

Figure 23:
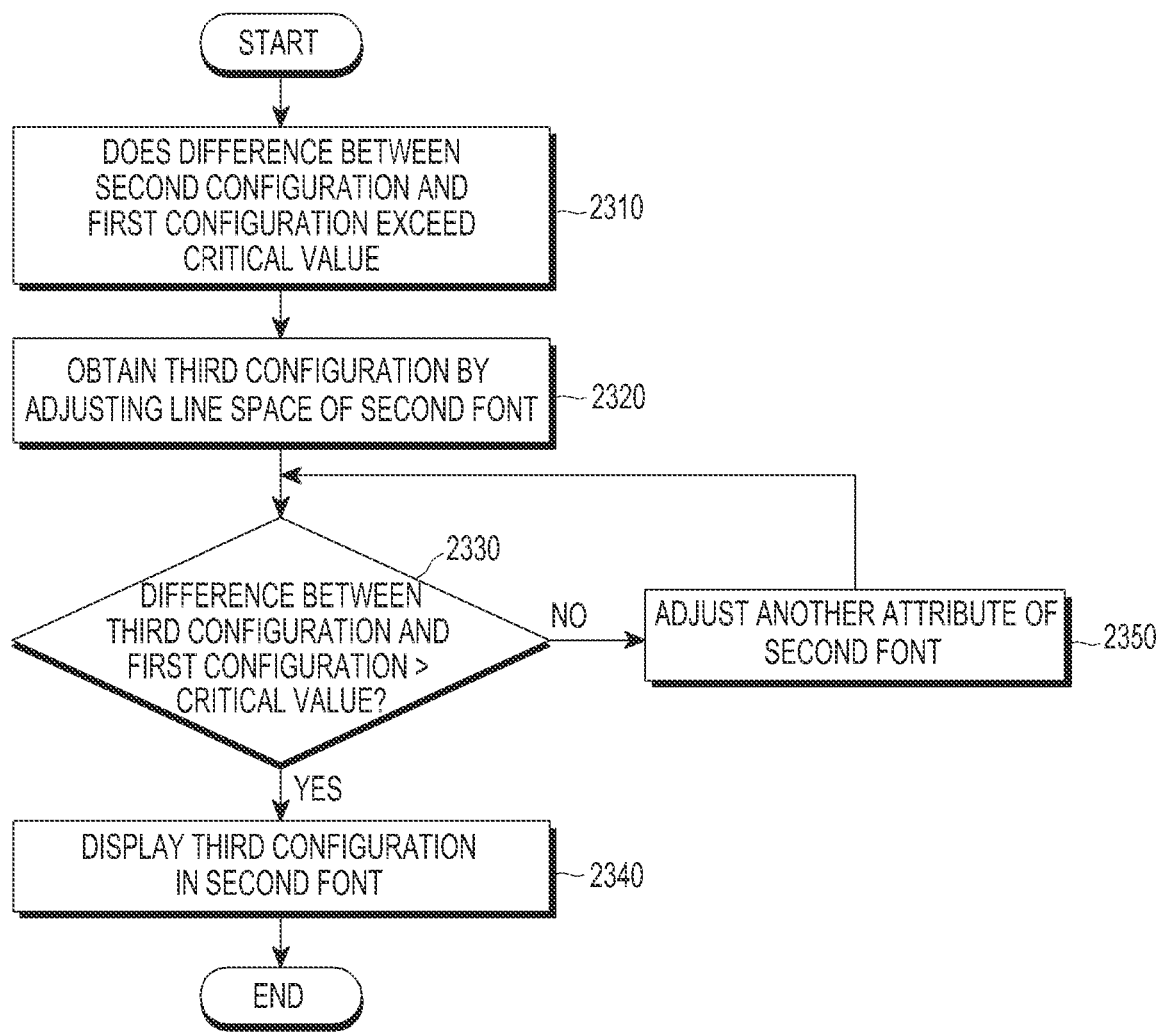
FIG. 23 is a flowchart for explaining a font-attribute adjustment, according to various embodiments of the present disclosure.

FIG. 23 is a flowchart illustrating a font attribute adjustment, according to various embodiments of the present disclosure. FIG. 23 will be described in more detail with reference to FIG. 24.

Figure 24:
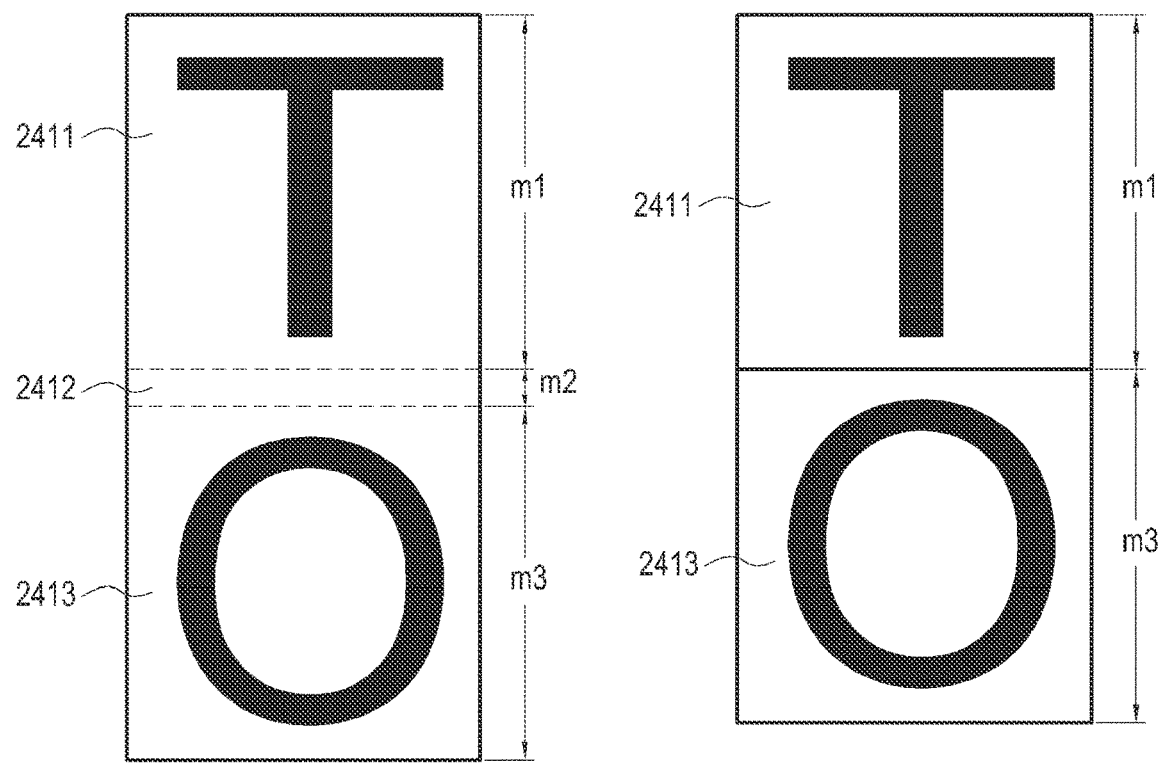
FIG. 24 illustrates a conceptual diagram for explaining a font-line space adjustment, according to various embodiments of the present disclosure.

FIG. 24 illustrates a conceptual diagram for explaining a font line space adjustment, according to various embodiments of the present disclosure.

Referring to FIGS. 23 and 24, in operation 2310, a first electronic apparatus 101 may determine whether or not a difference between a second configuration and a first configuration exceeds a critical value. Here, the first configuration may be configured on the basis of a first font, and the second configuration may be configured on the basis of a second font.

In operation 2320, the first electronic apparatus 101 may adjust a line space of the second font in order to thereby obtain a third configuration. For example, as shown in FIG. 24, the first electronic apparatus 101 may adjust a line space 2412 between a font "T" 2411 and a font "T" 2413 based on a predetermined attribute of the second font (that is, a predetermined line space 'm'). In addition, the first electronic apparatus 101 may adjust the predetermined line space (m) to be zero. Accordingly, the height of the layout may decrease from 'm1+m2+m3' to 'm1+m3.' The first electronic apparatus 101 may obtain the third configuration by adjusting the line space according to the above-described manner. Although the embodiment above has described the reduction in the line space, this is only an example, and the first electronic apparatus 101 may obtain the third configuration by increasing the line space of the second font.

The operations 2330 to 2350 of FIG. 23 may be the same as the operations 1330 to 1350 of FIG. 13, respectively, and thus the description of the operations 2230 to 2350 will be omitted.

Figure 25:
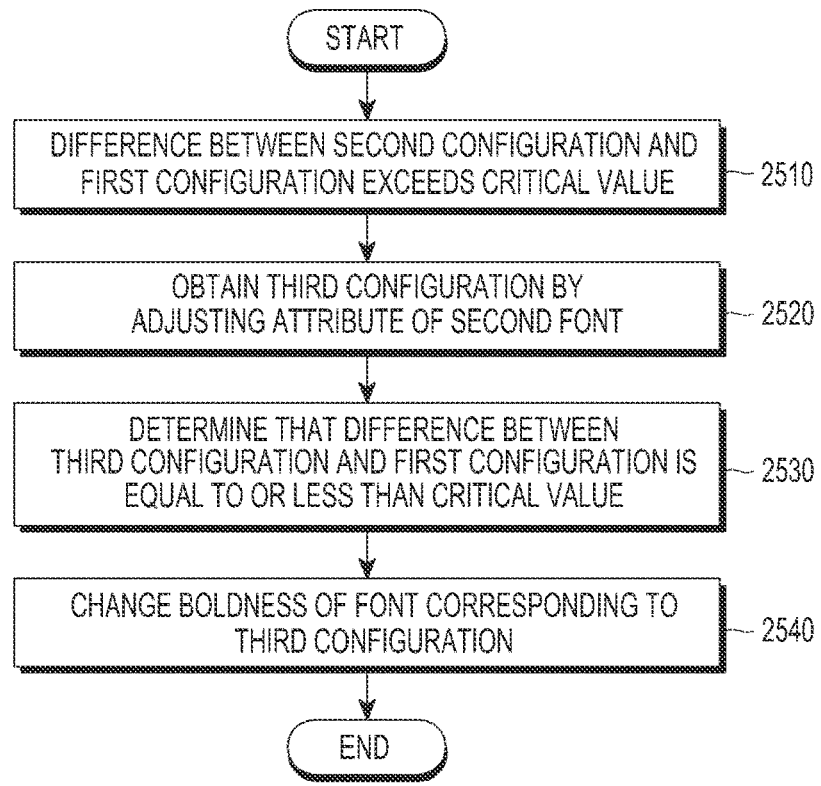
FIG. 25 is a flowchart for explaining a font-attribute adjustment, according to various embodiments of the present disclosure.

FIG. 25 is a flowchart for explaining a font attribute adjustment, according to various embodiments of the present disclosure. FIG. 25 will be described in more detail with reference to FIG. 26.

Figure 26:
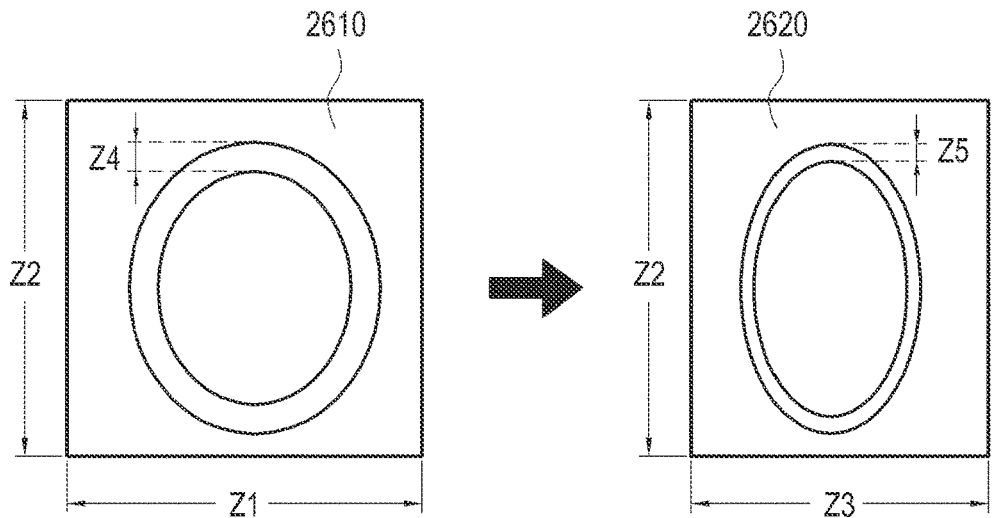
FIG. 26 illustrates a conceptual diagram for explaining a font-boldness adjustment, according to various embodiments of the present disclosure.

FIG. 26 shows a conceptual diagram for explaining a font boldness adjustment, according to various embodiments of the present disclosure.

Referring to FIGS. 25 and 26, in operation 2510, a first electronic apparatus 101 may determine whether or not a difference between a second configuration and a first configuration exceeds a critical value. The first configuration may be configured on the basis of a first font, and the second configuration may be configured on the basis of a second font.

In operation 2520, the first electronic apparatus 101 may adjust the second font attributes in order to thereby obtain a third configuration. For example, the first electronic apparatus 101 may adjust at least one of a width, a height, a height-to-width ratio, a kerning, a line space, or a size of the second font in order to thereby obtain the third configuration.

In operation 2530, the first electronic apparatus 101 may determine that the difference between the third configuration and the first configuration is less than or equal to a critical value, and may thus determine the third configuration to be displayed.

In operation 2540, the first electronic apparatus 101 may change a font boldness corresponding to the third configuration, and may display the same. For example, as shown in FIG. 26, a font "O" 2610 may have a width of z1, a height of z2, and a boldness of z4. For example, the first electronic apparatus 101 may obtain the third configuration by adjusting the width of a font "O" 2620 to z3. The first electronic apparatus 101 may reduce the font boldness to z5 in response to the reduction in the width thereof. Although it is not shown in the drawing, as the width increases, the first electronic apparatus 101 may increase the font boldness. Accordingly; even if the overall size of the font is changed, the visibility may be secured.

Figure 27:
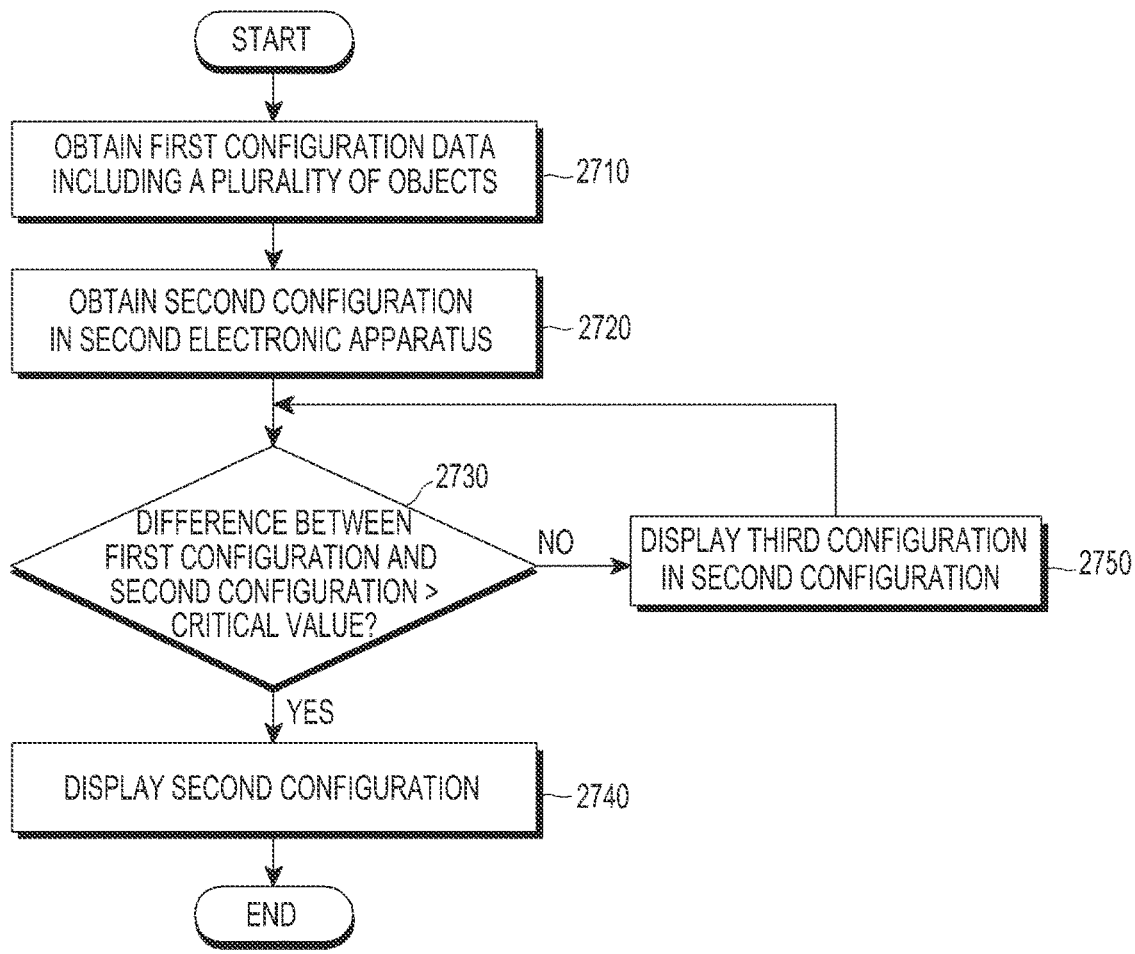
FIG. 27 is a flowchart of a screen configuration method, according to various embodiments of the present disclosure.

FIG. 27 is a flowchart of a screen configuration method, according to various embodiments of the present disclosure. FIG. 27 will be described in more detail with reference to FIGS. 28A to 28C.

Figure 28A:
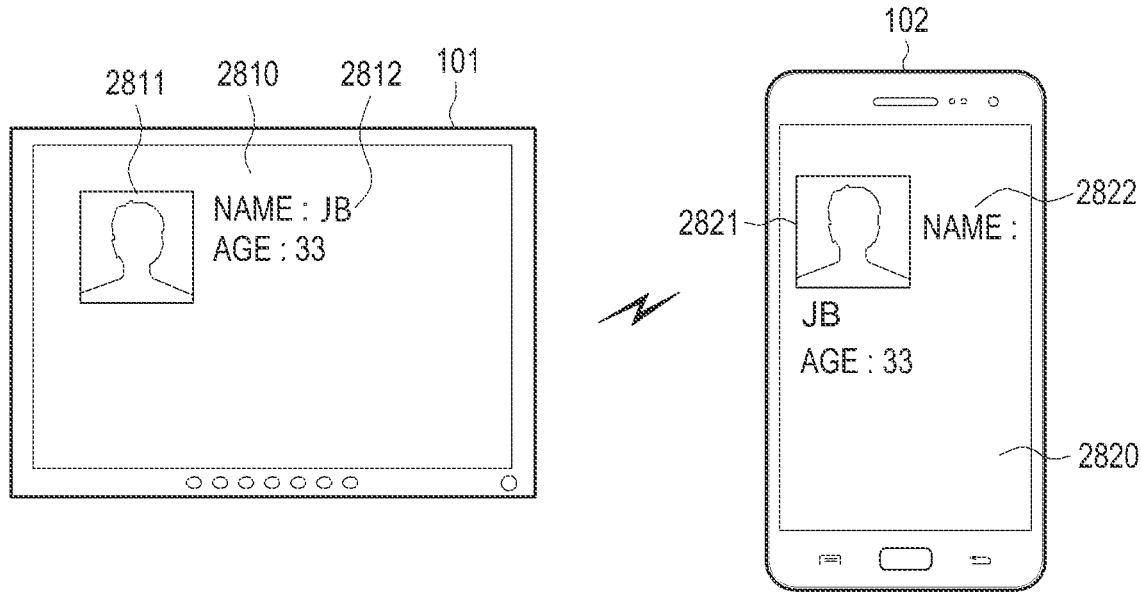
FIGS. 28A to 28C illustrate conceptual diagrams for explaining an object configuration, according to various embodiments of the present disclosure.
Figures 28B, 28C:
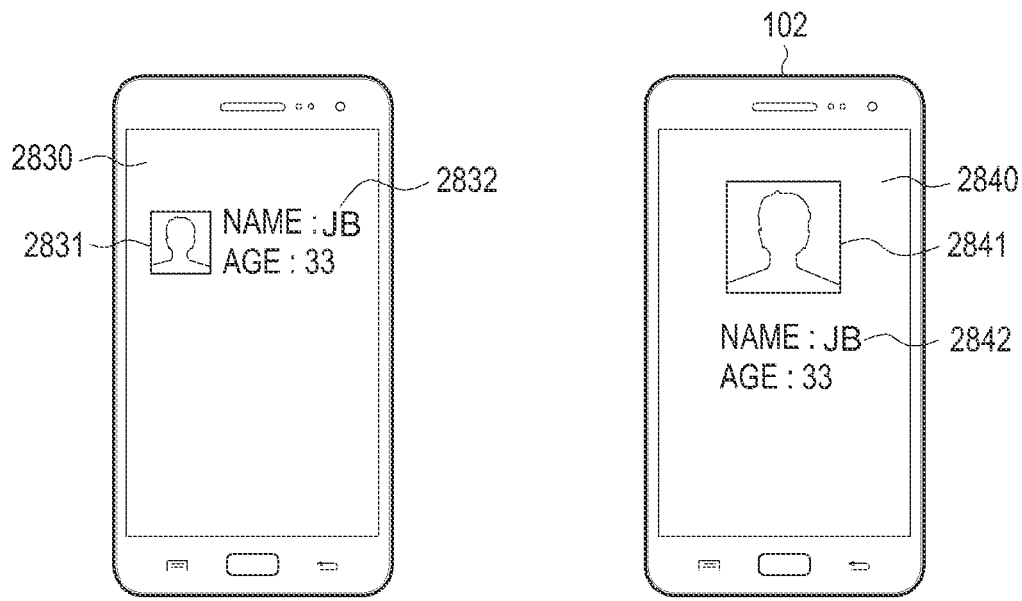

FIGS. 28A to 28C are conceptual diagrams illustrating an object configuration, according to various embodiments of the present disclosure.

Referring to FIGS. 27 and 28A to 28C, in operation 2710, a second electronic apparatus 102 may obtain data of a first configuration that includes a plurality of objects. For example, as shown in FIG. 28A, the second electronic apparatus 102 may receive the data that includes a plurality of objects from a first electronic apparatus 101. The data may include at least one of the object attributes or object layout information as well as a plurality of objects. The first electronic apparatus 101 may display a picture object 2811 and a font object 2812 in the first layout 2810. More particularly, the first electronic apparatus 101 may display the picture object 2811 based on the first picture attribute, and the first electronic apparatus 101 may display the font object 2812 based on the first font attribute. The first electronic apparatus 101 may configure the first layout 2810 based on the first picture attribute and the first font attribute.

In operation 2720, the second electronic apparatus 102 may obtain the second configuration. The second electronic apparatus 102 may display a second picture object 2821 based on the first picture attribute, and may display a second font object 2822 based on the second font attribute. The second electronic apparatus 102 may not support the first font, and thus the second electronic apparatus may display the second font object 2822 based on the second font attribute. The second electronic apparatus 102 may configure a second layout 2820 based on the first picture attribute and the second font attribute.

In operation 2730, the second electronic apparatus 102 may determine whether or not a difference between the first configuration and the second configuration is greater than a critical value. More specifically, the second electronic apparatus 102 may compare the difference between the attribute of the first layout 2810 and the attribute of the second layout 2820 with the critical value.

If the difference between the first configuration and the second configuration is less than or equal to the critical value, in operation 2740, the second electronic apparatus 102 may display the second configuration. If the difference between the first configuration and the second configuration is greater than the critical value, in operation 2750, the second electronic apparatus 102 may change the second configuration into the third configuration by adjusting the object attribute, and may display the same.

For example, as shown FIG. 28B, the second electronic apparatus 102 may adjust the first photo attribute in order to thereby configure a third layout 2830 while maintaining the second font attribute. The second electronic apparatus 102 may reduce the size of the picture, and may display a reduced picture object 2831. In addition, the second electronic apparatus 102 may display a font object 2832 based on the second font attribute.

Alternatively, as shown in FIG. 28C, the second electronic apparatus 102 may adjust the line position of the font in order to thereby configure a third layout 2840 while maintaining the first photos attribute. The second electronic apparatus 102 may display a picture object 2841 based on the first picture attribute, and may display a font object 2842 based on the adjusted second font attribute.

As described above, the electronic apparatus, according to various embodiments of the present disclosure, may adjust the object attribute of an additional object as well as the font attribute in order to thereby create the layout similar to the original layout.

Figure 29:
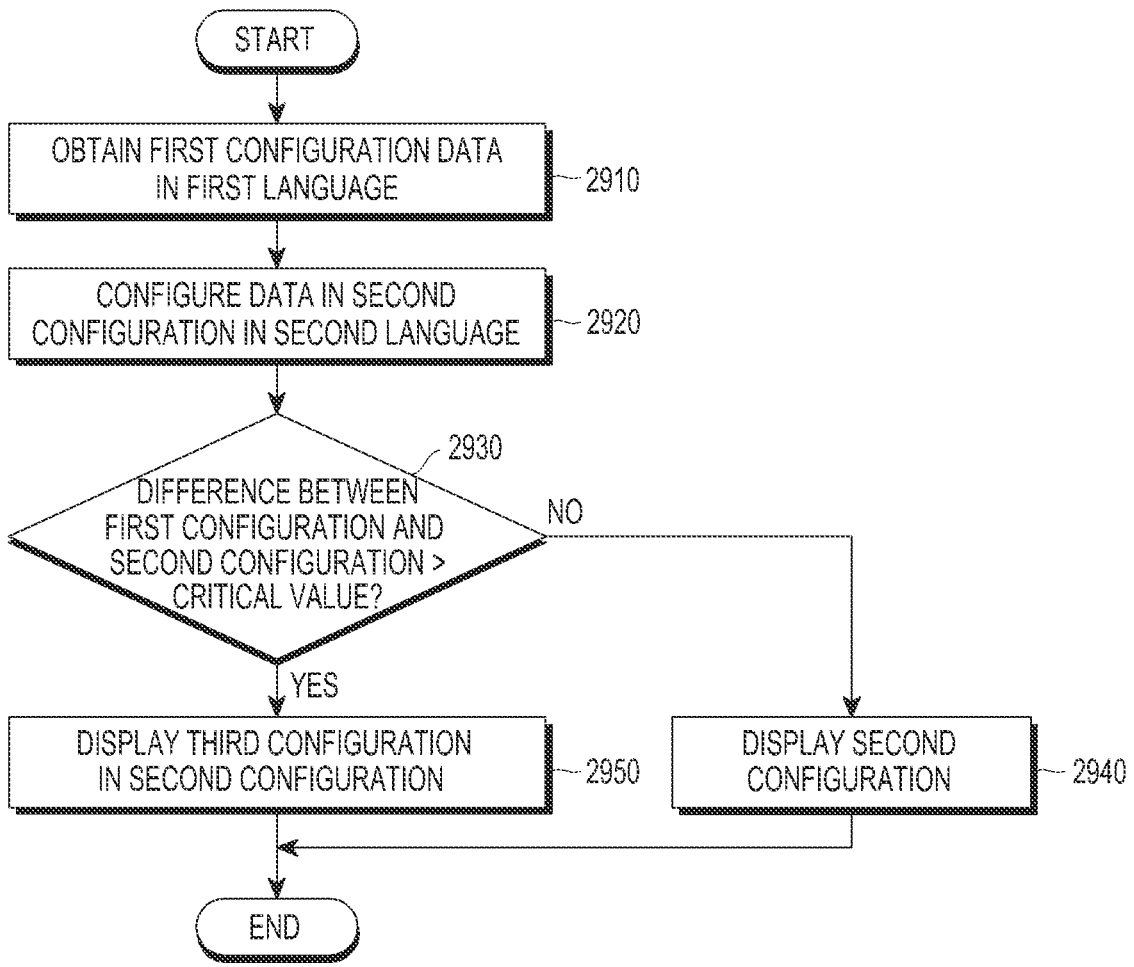
FIG. 29 is a flowchart of a screen configuration method, according to various embodiments of the present disclosure.

FIG. 29 is a flowchart of a screen configuration method, according to various embodiments of the present disclosure. FIG. 29 will be described in more detail with reference to FIGS. 30A and 30B.

Figure 30A:
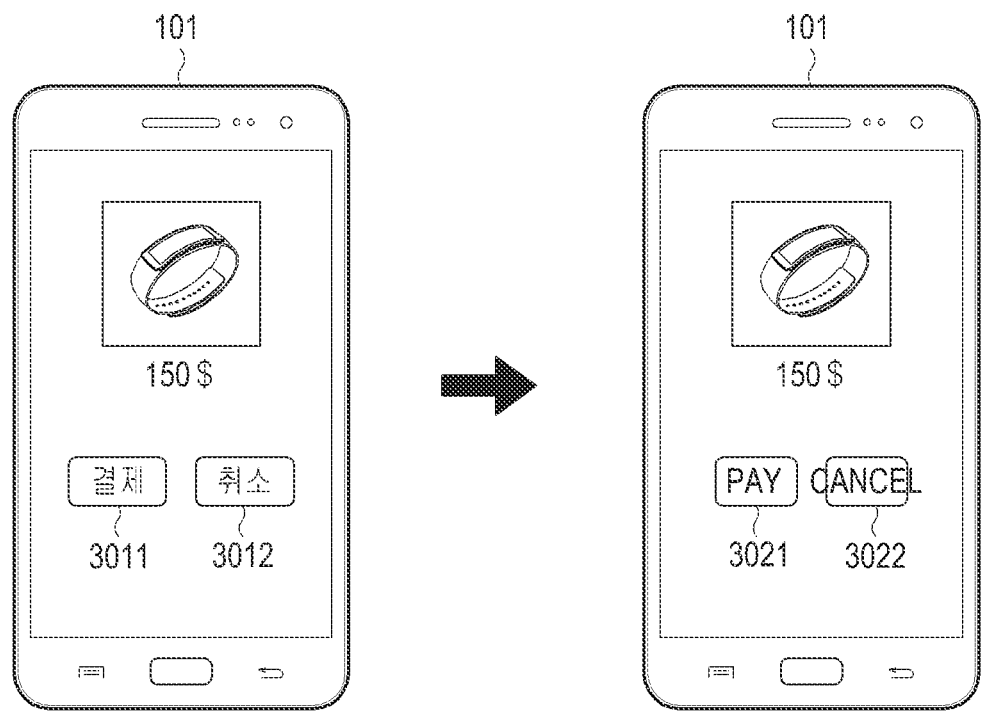
FIGS. 30A and 30B illustrate conceptual diagrams for explaining an object configuration, according to various embodiments of the present disclosure.
Figure 30B:
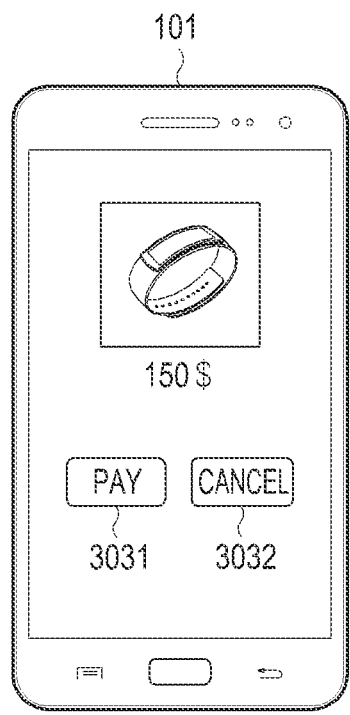

FIGS. 30A and 30B are schematic diagrams illustrating an object configuration, according to various embodiments of the present disclosure.

Referring to FIGS. 29, 30A and 30B, in operation 2910, a first electronic apparatus 101 may obtain data in a first configuration and a first language. For example, as shown in FIG. 30A, the first electronic apparatus 101 may display font objects 3011 and 3012 in Korean together with other objects.

In operation 2920, the first electronic apparatus 101 may obtain the data in a second configuration and a second language. For example, the first electronic apparatus 101 may obtain a language changing command, and may change an object in Korean into an object in English to then be displayed. As shown in FIG. 30A, the first electronic apparatus 101 may display font objects 3021 and 3022 in English together with other objects. However, as shown in FIG. 30A, the font object 3021 and 3022 in English may be displayed beyond the boundary of the object. This is due to the fact the first electronic apparatus 101 configures the font objects 3021 and 3022 based on a predetermined font attribute related to the English language.

In operation 2930, the first electronic apparatus 101 may determine whether or not the difference between the first configuration and the second configuration is greater than a critical value. If the difference between the first configuration and the second configuration is less than equal to the critical value, in operation 2940, the first electronic apparatus 101 may display the second configuration.

If the difference between the first configuration and the second configuration is greater than the critical value, in operation 2950, the first electronic apparatus 101 may change the second configuration into a third configuration to then be displayed. For example, the first electronic apparatus 101 may adjust the English-font attribute in order to thereby obtain the third configuration. As shown in FIG. 30B, the first electronic apparatus 101 may display font objects 3031 and 3032 that are made by changing the attribute.

In the description above, the first electronic apparatus 101 may change the second configuration into the third configuration based on the difference between the first configuration and the second configuration.

Figure 31:
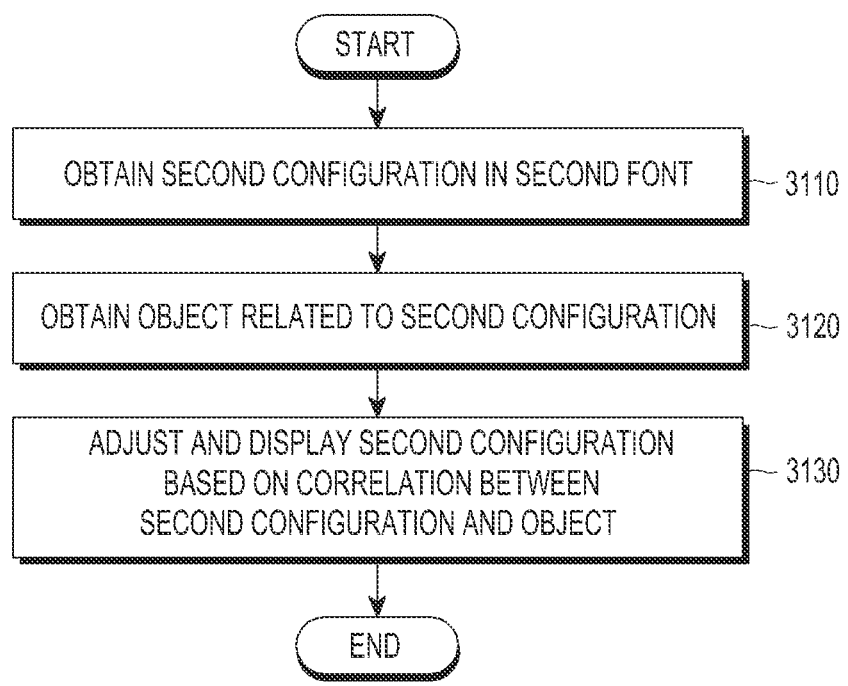
FIG. 31 is a flowchart of a screen configuration method, according to various embodiments of the present disclosure.

FIG. 31 is a flowchart of a screen configuration method, according to various embodiments of the present disclosure.

Referring to FIG. 31, in operation 3110, a first electronic apparatus 101 may obtain a second configuration in a second font. For example, as shown in FIG. 30A, the first electronic apparatus 101 may display font objects 3021 and 3022 in English.

In operation 3120, the first electronic apparatus 101 may obtain the object related to the second configuration. For example, as shown in Ha 30A, the first electronic apparatus 101 may detect circular objects that are related to the font objects 3021 and 3022. The first electronic apparatus 101 may detect the related objects by comparing the positions of the font objects 3021 and 3022 with the position of the other object.

In operation 3130, the first electronic apparatus 101 may adjust and display the second configuration based on the correlation of the object related to the second configuration. For example, the first electronic apparatus 101 may determine that the font objects 3021 and 3022 exceed the related circular Objects. The font objects 3021 and 3022 may be pre-configured to be placed inside the circular objects. Accordingly, the first electronic apparatus 101 may adjust the font attribute, and may display the adjusted font objects 3031 and 3032 as shown in FIG. 30B.

According to an embodiment of the present disclosure, a method of configuring a screen of an electronic apparatus may include: obtaining the data that is configured in the first configuration based on the first font; configuring the data in the second configuration, based on the second font; and if the difference between the first configuration and the second configuration is greater than a predetermined critical value, changing the second configuration into the third configuration to then be displayed, wherein the difference between the first configuration and the third configuration is less than the predetermined critical value. The second configuration may be pre-configured to correspond to the second font.

According to an embodiment of the present disclosure, the operation of changing the second configuration into the third configuration may include an operation of adjusting attributes of the second font in order to thereby change the data into the third configuration.

According to an embodiment of the present disclosure, the operation of changing the second configuration into the third configuration may include an operation of changing at least one of a width, a height-to-width ratio, a kerning, a height, a size, and a line space of the second font to then be displayed.

According to an embodiment of the present disclosure, the screen configuration method of the electronic apparatus may further include an operation of adjusting the boldness of the second font based on the adjusted second font attributes.

According to an embodiment of the present disclosure, the screen configuration method of the electronic apparatus may further include an operation of comparing the difference between the first configuration and the second configuration.

According to an embodiment of the present disclosure, the method may further include: obtaining the first layout attribute of the first configuration; and comparing the first layout attribute with the second layout attribute of the second configuration.

According to an embodiment of the present disclosure, the operation of comparing the first layout attribute with the second layout attribute of the second configuration may include an operation of comparing at least one of width, height, a width-to-height ratio, or area between the first layout and the second layout.

According to an embodiment of the present disclosure, the operation of configuring the data in the second configuration, based on the second font, may include an operation of configuring the second configuration to correspond to a display of the electronic apparatus.

According to an embodiment of the present disclosure, the operation of obtaining the data may include an operation of receiving the data from another electronic apparatus that configures the first configuration based on the first font.

According to an embodiment of the present disclosure, the screen configuration method of the electronic apparatus may further include: determining whether or not the electronic apparatus supports the first font; and if the first font is not supported, determining the second font related to the first font.

According to an embodiment of the present disclosure, the operation of configuring the data in the second configuration may include: obtaining a font changing command by which the first font is to be changed into the second font; and in response to the font changing command, configuring the data in the second configuration by using the second font.

According to an embodiment of the present disclosure, an electronic apparatus may include: a display; and a processor that makes a control, when the data that is configured in the first configuration based on the first font is obtained, to configure the data in the second configuration based on the second font, and if the difference between the first configuration and the second configuration is greater than a predetermined critical value, to change the second configuration into the third configuration to then be displayed, wherein the difference between the first configuration and the third configuration is less than the predetermined critical value. The second configuration may be pre-configured to correspond to the second font.

According to an embodiment of the present disclosure, the processor may adjust attributes of the second font in order to thereby configure the data in the third configuration.

According to an embodiment of the present disclosure, the processor may make a control to change at least one of a width, a height-to-width ratio, a kerning, a height, a size, and a line space of the second font to then be displayed.

According to an embodiment of the present disclosure, the processor may adjust the boldness of the second font based on the adjusted second font attributes.

According to an embodiment of the present disclosure, the processor may compare the difference between the first configuration and the second configuration.

According to an embodiment of the present disclosure, the processor may obtain the first layout attribute of the first configuration, and may compare the first layout attribute with the second layout attribute of the second configuration. The processor may compare at least one of width, height, a width-to-height ratio, or area between the first layout and the second layout.

According to an embodiment of the present disclosure, the processor may configure the second configuration to correspond to a display of the electronic apparatus.

According to an embodiment of the present disclosure, the processor may receive the data from another electronic apparatus, and the first configuration may be configured to correspond to a display of another electronic apparatus.

According to an embodiment of the present disclosure, the processor may determine whether or not the electronic apparatus supports the first font, and if the first font is not supported, may determine the second font related to the first font.

According to an embodiment of the present disclosure, the processor may obtain a font changing command by which the first font is to be changed into the second font, and in response to the font changing command, may configure the data in the second configuration by using the second font.

According to an embodiment of the present disclosure, a method of configuring a screen may include: obtaining the data that includes the first configuration that is comprised of a plurality of objects to correspond to the first display; configuring the data in the second configuration to correspond to the second display; and if the difference between the first configuration and the second configuration is greater than a predetermined critical value, changing the second configuration into the third configuration that corresponds to the first configuration to then be displayed.

According to an embodiment of the present disclosure, a method of configuring a screen may include: obtaining the data that includes the first object related to the first font, and the second object; and changing an attribute of the first object, based on the correlation between the first object and the second object, to display the same.

According to an embodiment of the present disclosure, a method of configuring a screen of the second electronic apparatus that communicates with the first electronic apparatus may include: obtaining the data in the first font from the first electronic apparatus; expressing the data by using the second font; and if the second layout based on the second font is different from the first layout based on the first font, changing an attribute of the second font such that the second layout corresponds to the first layout, and displaying the same.

Each of the components of the electronic device according to the present disclosure may be implemented by one or more components and the name of the corresponding component may vary depending on a type of the electronic device, in various embodiments, the electronic device may include at least one of the above-described elements. Some of the above-described elements may be omitted from the electronic device, or the electronic device may further include additional elements. Further, some of the components of the electronic device according to the various embodiments of the present disclosure may be combined to form a single entity, and thus, may equivalently execute functions of the corresponding elements prior to the combination.

The term "module" as used herein may, for example, mean a unit including one of hardware, software, and firmware or a combination of two or more of them. The "module" may be interchangeable with a term, such as a unit, a logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments of the present disclosure, at least some of the devices (for example, modules or functions thereof) or the method (for example, operations) according to the present disclosure may be implemented by a command stored in a computer-readable storage medium in a programming module form. When the command is executed by one or more processors (for example, the processor 120), the one or more processors may execute a function corresponding to the command. The computer-readable storage medium may be, for example, the memory 130.

The computer readable recoding medium may include a hard disk, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments of the present disclosure, a computer-readable storage medium may store a screen configuration application that executes the operations of: obtaining the data that is configured in the first configuration based on the first font, configuring the data in the second configuration, based on the second font; and if the difference between the first configuration and the second configuration is greater than a predetermined critical value, changing the second configuration into the third configuration to then be displayed, wherein the difference between the first configuration and the third configuration is less than a predetermined critical value.

While the present disclosure has been shown and described with reference to various embodiments hereof, it will be understood by those skilled in the art that various changes in form and details may be made therein without departing from the spirit and scope of the present disclosure as defined by the appended claims and their equivalents.

What is claimed is:

1. A method of configuring a screen of an electronic apparatus, the method comprising:
   obtaining data that is configured in a first configuration based on a first font;
   configuring the data in a second configuration based on a second font;
   calculating a difference between a first layout attribute of the first configuration and a second layout attribute of the second configuration; and
   changing, if the difference is greater than a predetermined critical value, the second configuration into a third configuration to then be displayed,
   wherein a difference between the first layout attribute of the first configuration and a third layout attribute of the third configuration is less than the predetermined critical value.

2. The method of claim 1, wherein the second configuration is pre-configured to correspond to the second font.

3. The method of claim 1, wherein the changing of the second configuration into the third configuration comprises adjusting attributes of the second font to change the data into the third configuration.

4. The method of claim 3, wherein the changing of the second configuration into the third configuration comprises changing at least one of a width, a height-to-width ratio, a kerning, a height, a size, and a line space of the second font.

5. The method of claim 3, further comprising adjusting a font weight of the second font based on the adjusted second font attributes.

6. The method of claim 1, further comprising determining the first layout attribute based on attributes of the first font.

7. The method of claim 6, wherein each of the first layout attribute and the second layout attribute comprises at least one of a width, a height, a width-to-height ratio, or an area between the first layout and the second layout.

8. The method of claim 1, wherein the configuring of the data in the second configuration, based on the second font, comprises configuring the second configuration to correspond to a display of the electronic apparatus.

9. The method of claim 1, wherein the obtaining of the data comprises receiving the data from another electronic apparatus that configures the first configuration based on the first font.

10. The method of claim 9, further comprising:
    determining whether the electronic apparatus supports the first font; and
    determining, if the first font is not supported, the second font related to the first font.

11. The method of claim 1, wherein the configuring of the data in the second configuration comprises:
    obtaining a font changing command by which the first font is to be changed into the second font; and
    configuring, in response to the font changing command, the data in the second configuration by using the second font.

12. An electronic apparatus comprising:
    a display; and
    a processor configured to:
    configure, when data that is configured in a first configuration based on a first font is obtained, the data in a second configuration based on a second font,
    calculating a difference between a first layout attribute of the first configuration and a second layout attribute of the second configuration, and
    change, if the difference is greater than a predetermined critical value, the second configuration into a third configuration to then be displayed,
    wherein a difference between the first layout attribute of the first configuration and a third layout attribute of the third configuration is less than the predetermined critical value.

13. The electronic apparatus of claim 12, wherein the second configuration is pre-configured to correspond to the second font.

14. The electronic apparatus of claim 12, wherein the processor is further configured to adjust attributes of the second font to configure the data in the third configuration.

15. The electronic apparatus of claim 14, wherein the processor is further configured to change at least one of a width, a height-to-width ratio, a kerning, a height, a size, and a line space of the second font.

16. The electronic apparatus of claim 14, wherein the processor is further configured to adjust a font weight of the second font based on the adjusted second font attributes.

17. The electronic apparatus of claim 12, wherein the processor is further configured to determine the first layout attribute based on attributes of the first font.

18. The electronic apparatus of claim 17, wherein the processor is further configured to:
receive the first layout attribute of the first configuration from another electronic device.

19. The electronic apparatus of claim 18, wherein each of the first layout attribute and the second layout attribute comprises at least one of a width, a height, a width-to-height ratio, or an area between the first layout and the second layout.

20. The electronic apparatus of claim 12, wherein the processor is further configured to configure the second configuration to correspond to a display of the electronic apparatus.

21. The electronic apparatus of claim 12, wherein the processor is further configured to receive the data from another electronic apparatus, and the first configuration is configured to correspond to a display of another electronic apparatus.

22. The electronic apparatus of claim 21, wherein the processor is further configured to:
determine whether the electronic apparatus supports the first font, and
determine, if the first font is not supported, the second font related to the first font.

23. The electronic apparatus of claim 12, wherein the processor is further configured to:
obtain a font changing command by which the first font is to be changed into the second font, and
configure, in response to the font changing command, the data in the second configuration by using the second font.

24. A method of configuring a screen, the method comprising:
obtaining data that includes a first configuration that includes a plurality of objects to correspond to a first display;
configuring the data into a second configuration to correspond to a second display;
calculating a difference between a first layout attribute of the first configuration and a second layout attribute of the second configuration; and
changing, if the difference is greater than a predetermined critical value, the second configuration into a third configuration that corresponds to the first configuration to then be displayed.

* * * * *